(12) United States Patent
Bader et al.

(10) Patent No.: US 7,462,145 B2
(45) Date of Patent: Dec. 9, 2008

(54) MACHINE TOOL

(75) Inventors: Thomas Bader, Gosheim (DE);
Hans-Dieter Braun, Frittlingen (DE)

(73) Assignee: Haas Schleitmaschinen GmbH, Trossingen (DE)

( * ) Notice: Subject to any disclaimer, the term of this patent is extended or adjusted under 35 U.S.C. 154(b) by 0 days.

(21) Appl. No.: 11/890,514

(22) Filed: Aug. 7, 2007

(65) Prior Publication Data

US 2008/0039305 A1 Feb. 14, 2008

(30) Foreign Application Priority Data

Aug. 9, 2006 (DE) .................. 10 2006 037 434

(51) Int. Cl.
*B23Q 3/157* (2006.01)
*B23Q 3/155* (2006.01)

(52) U.S. Cl. .............................. 483/63; 483/67; 483/16; 483/33; 483/56; 211/69; 211/70.6; 211/1.53; 211/1.55

(58) Field of Classification Search .................. 483/33, 483/16, 54–57, 58, 63, 67, 66, 64; 211/1.53, 211/1.55, 1.52, 69, 70.6
See application file for complete search history.

(56) References Cited

U.S. PATENT DOCUMENTS

| | | | | |
|---|---|---|---|---|
| 3,300,856 A | * | 1/1967 | Daugherty | 483/67 |
| 3,868,763 A | * | 3/1975 | Sato | 483/65 |
| 4,087,901 A | * | 5/1978 | Lohneis et al. | 483/61 |
| 4,119,213 A | * | 10/1978 | Sato et al. | 483/67 |
| 4,156,962 A | * | 6/1979 | Haller | 483/67 |
| 4,304,040 A | * | 12/1981 | Staiger et al. | 483/54 |
| 4,344,221 A | * | 8/1982 | Pagani | 483/67 |
| 4,394,908 A | | 7/1983 | Pinchemaille | |
| 4,557,035 A | * | 12/1985 | Rutschle et al. | 483/62 |
| 4,590,662 A | * | 5/1986 | Norota | 483/64 |
| 5,364,329 A | | 11/1994 | Liné | |
| 6,126,526 A | * | 10/2000 | Herrscher et al. | 451/259 |
| 6,228,006 B1 | * | 5/2001 | Horn et al. | 483/55 |

FOREIGN PATENT DOCUMENTS

| | | | |
|---|---|---|---|
| CH | 673607 A5 | * | 3/1990 |
| DE | 2300708 A1 | * | 7/1973 |
| DE | 37 13 515 | | 10/1987 |
| DE | 4342630 | | 6/1994 |
| DE | 19708096 | | 9/1998 |
| DE | 19844242 C2 | * | 9/2000 |
| DE | 203 07 998 | | 8/2003 |
| EP | 0 480 416 | | 4/1992 |
| EP | 1 260 306 | | 11/2002 |
| JP | 60-123240 A | * | 7/1985 |
| JP | 2005-103687 A | * | 4/2005 |

* cited by examiner

*Primary Examiner*—Erica E Cadugan
(74) *Attorney, Agent, or Firm*—Nath Law Group; Jerald L. Meyer; Derek Richmond

(57) ABSTRACT

A machine tool is described, in particular a grinding machine, with a tool storage device. The tool storage device contains an outer magazine wheel (34) and an inner magazine wheel (58), which are independently concentrically rotatable in a controlled manner. The outer magazine wheel (34) preferably holds grinding tools (56), while the inner magazine wheel (58) preferably holds grinding wheel protectors (68). The grinding tool (56) and the grinding wheel protector (68) are removed from the tool storage device and are returned to the latter by the tool spindle (30). The grinding tools (56) and grinding wheel protectors (68) can be exchanged independently in arbitrary combinations and possibly also simultaneously.

11 Claims, 24 Drawing Sheets

MACHINE TOOL

Figure 1:
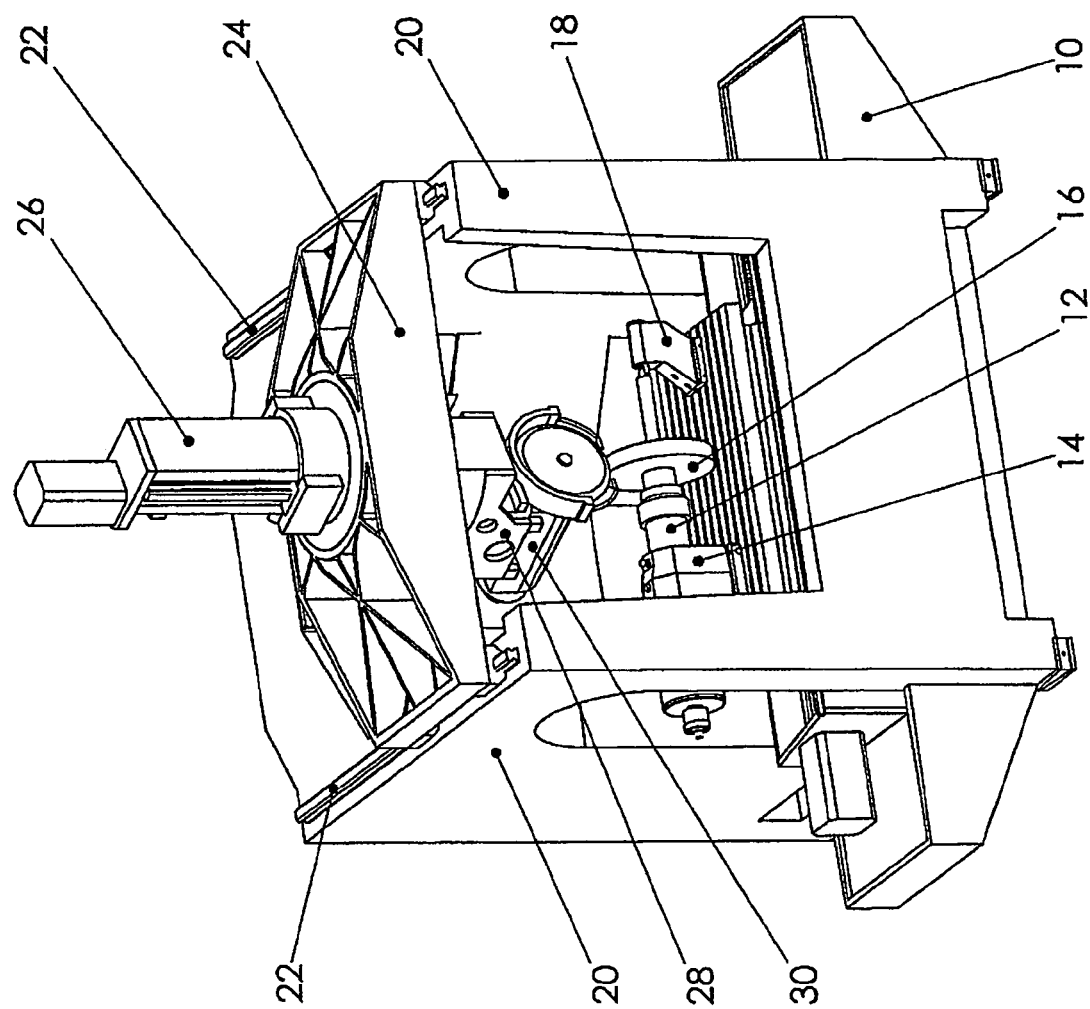

This invention concerns a machine tool with at least one tool spindle and with a tool storage device which holds several tools in tool holders and is movable in a controlled manner in order to bring a respectively selectable tool holder into an exchange position, with the tools being arranged in the tool holders to that their longitudinal axes lie in the plane of motion of the tool storage device and with the tool spindle able to take the tools in the exchange position out of the tool holder and deliver them into the tool holder as the tool spindle is moved into axial alignment with the tool.

Tool magazines which can accept several tools are frequently used in machine tools for machine processing work pieces, e.g. for grinding, milling, drilling, reaming, turning, polishing and thread cutting. In particular, if a work piece is machined in successive steps with different tools, it is important for the tools held in the magazine to be exchanged rapidly into the tool spindle. Different kinds of systems for exchanging tools between the tool magazine and the tool spindle are known.

In the so-called pick-up system, the tool spindle and the tool storage device are displaced relative to one another and are positioned opposite each other so that the tool spindle can take the respective tool directly from the magazine or respectively can deposit a previously used tool in the tool magazine. In this connection, the tool spindle can be displaced relative to the tool magazine, or the tool magazine relative to the tool spindle, in order to bring the tool spindle and the corresponding tool holder of the tool magazine into the mutual exchange position.

A grinding machine in which the tool storage device is linearly displaceable relative to the tool spindle in order to bring a respectively selected tool holder into the exchange position is known from DE 198 44 242 C2. The tool holders are arranged linearly next to each other along the displacement axis, with the tools being accepted in these tool holders so that their axis lies in the plane of motion. The tool spindle can be moved with its tool receiver axially aligned with the tool shaft in order to deliver the tool into the tool holder or to take it out of the tool holder. Each tool holder of the tool storage device thus accepts a grinding tool and a coolant supply device associated with this grinding tool. Each of the grinding tools can be exchanged only together with their associated coolant supply device.

A machine tool in which a tool magazine is configured as a chain rotating about a plane is known from DE 23 00 708 A1. The tools are accepted in the tool holders of this tool magazine with their axis extending radially in the rotating plane. The clampable shafts of the tools are thus oriented radially inward. The exchange of the tools takes place via a swiveling tool gripping arm, which seizes the tools outside the tool storage device and exchanges them into the tool spindle.

It is the object of this invention to design a machine tool of the kind specified above with a tool storage device which allows for simple tool exchange and high flexibility.

This objective is achieved by a machine tool with the characteristics of the present invention.

The tool storage device of this invention has two tool magazines which are movable independently in a controlled manner. The two tool magazines are configured so that they accept each of the tools with their axis lying in the plane of motion, with the axes of the tools being axially aligned in the same manner in both tool magazines. The tool holders of the two tool magazines are separated from each other in the axial direction of the tools so that the tool magazines equipped with the tools can be moved relative to each other in an unhindered manner. The tool spindle can remove tools out of each of the two tool magazines or can deposit them into the tool magazines directly via an axial motion.

This results in considerable flexibility in the use of tool storage. Both tool magazines can be loaded with the same or different tools. This results in a substantial increase in the tool accommodation capacity of the entire tool storage device, without its dimensions having to be increased substantially. The tools can be exchanged alternatively from one or the other tool magazine. In another application, it is possible to store tools and accessory devices associated with them. In a preferred embodiment, in which the machine tool is configured as a grinding machine, it is for example possible to store grinding tools and associated grinding wheel protectors and/or cooling agent feeds. In particular this allows one tool magazine to store the processing tools, e.g. the grinding wheels, and the other tool magazine to store the accessory devices, e.g. grinding wheel protectors. The separate controllability of the two tool magazines thus makes it possible to combine grinding tools with accessory devices in arbitrarily selectable combinations. E.g., it is possible to store several grinding tools of the same kind and a smaller number of associated grinding wheel protectors, since the grinding tools are subject to more wear. A worn out grinding tool can be interchanged without the associated grinding wheel protector having to be changed. It is also possible to simultaneously align a grinding tool in one tool magazine and an associated grinding wheel protector in the other tool magazine in the exchanging position, so that the grinding tool and the associated grinding wheel protector can be immediately interchanged one after the other during an exchange process.

The tool magazines are preferably designed as rotary tool magazines in order to achieve a high capacity in a small surface area. A structurally simple solution is achieved in that the two tool magazines are configured as concentrically mounted magazine wheels that can be rotated relative to each other.

The magazine wheels can then have a segment-shaped cutout. In the neutral position of the tool magazine, this segment-like cutout is set to coincide with the working space of the machine tool, whereby the tool magazine can be shifted with its axis of rotation nearer to the working space and the area demand of the machine tool is reduced.

The tool storage device is preferably modularly composed of the two tool magazines. This provides a further increase in flexibility, since the tool storage device can be optionally equipped with only one tool magazine or with both tool magazines according to the respective requirements.

Figure 3:
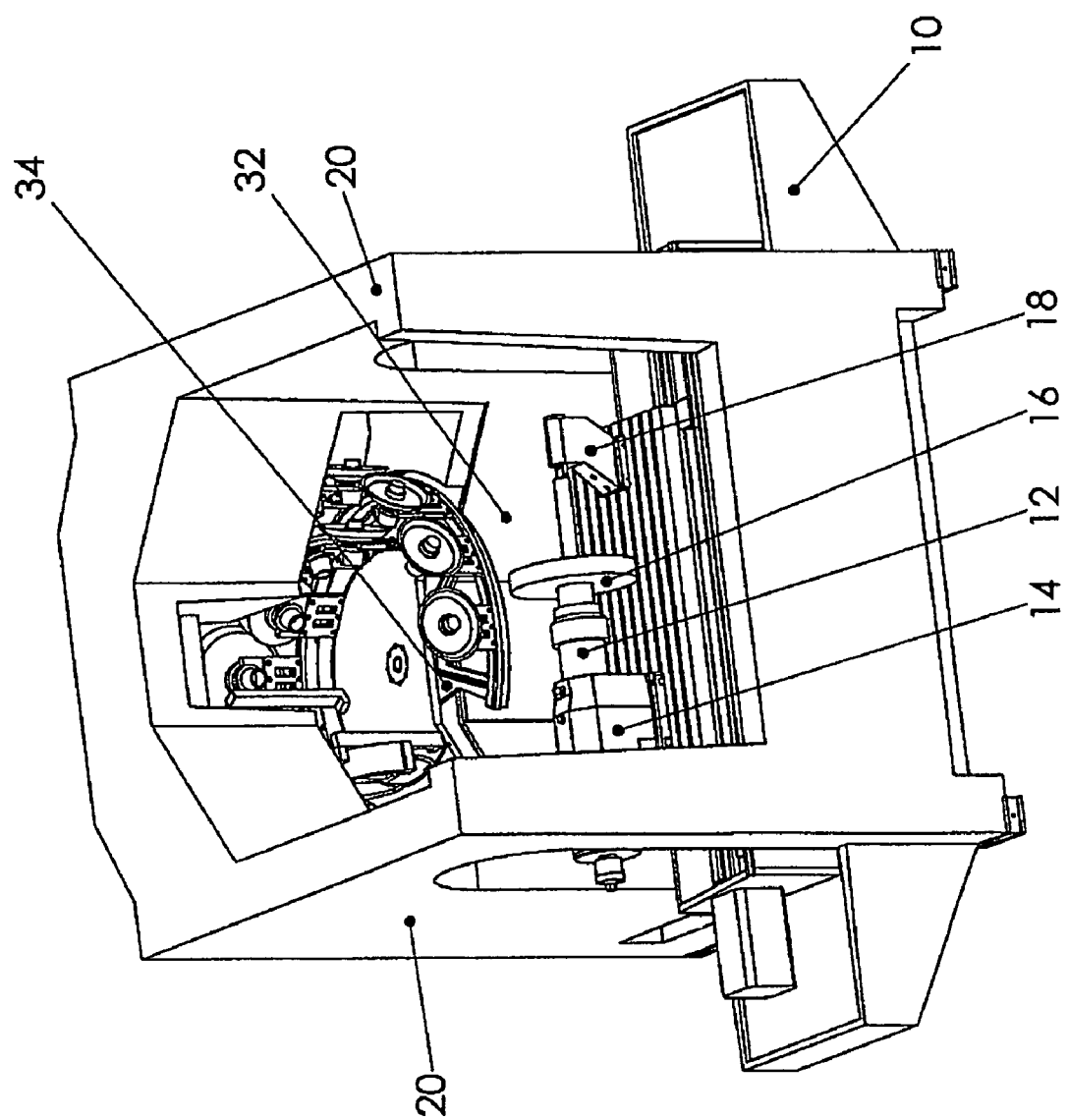
Figure 4:
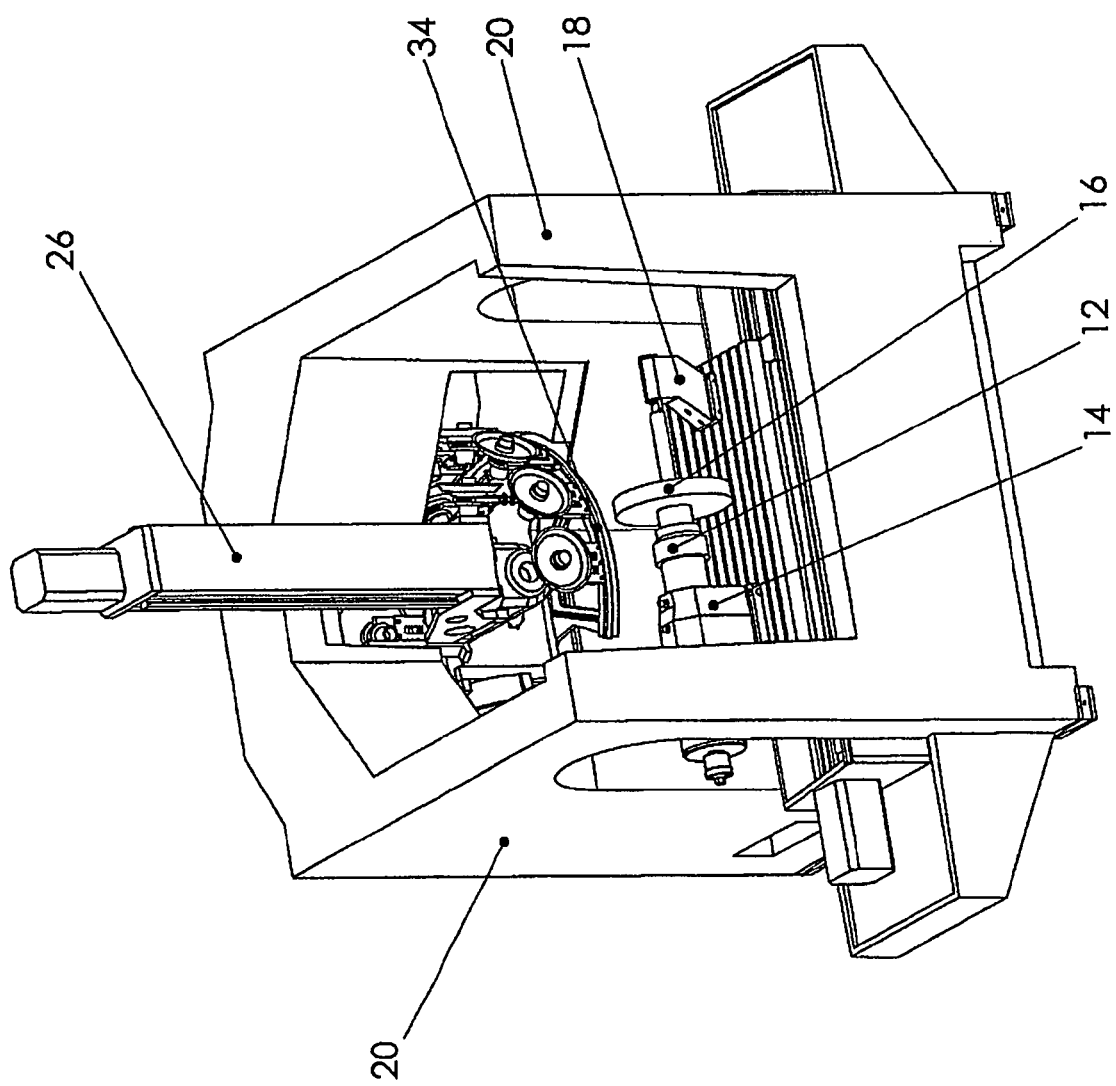
Figure 8:
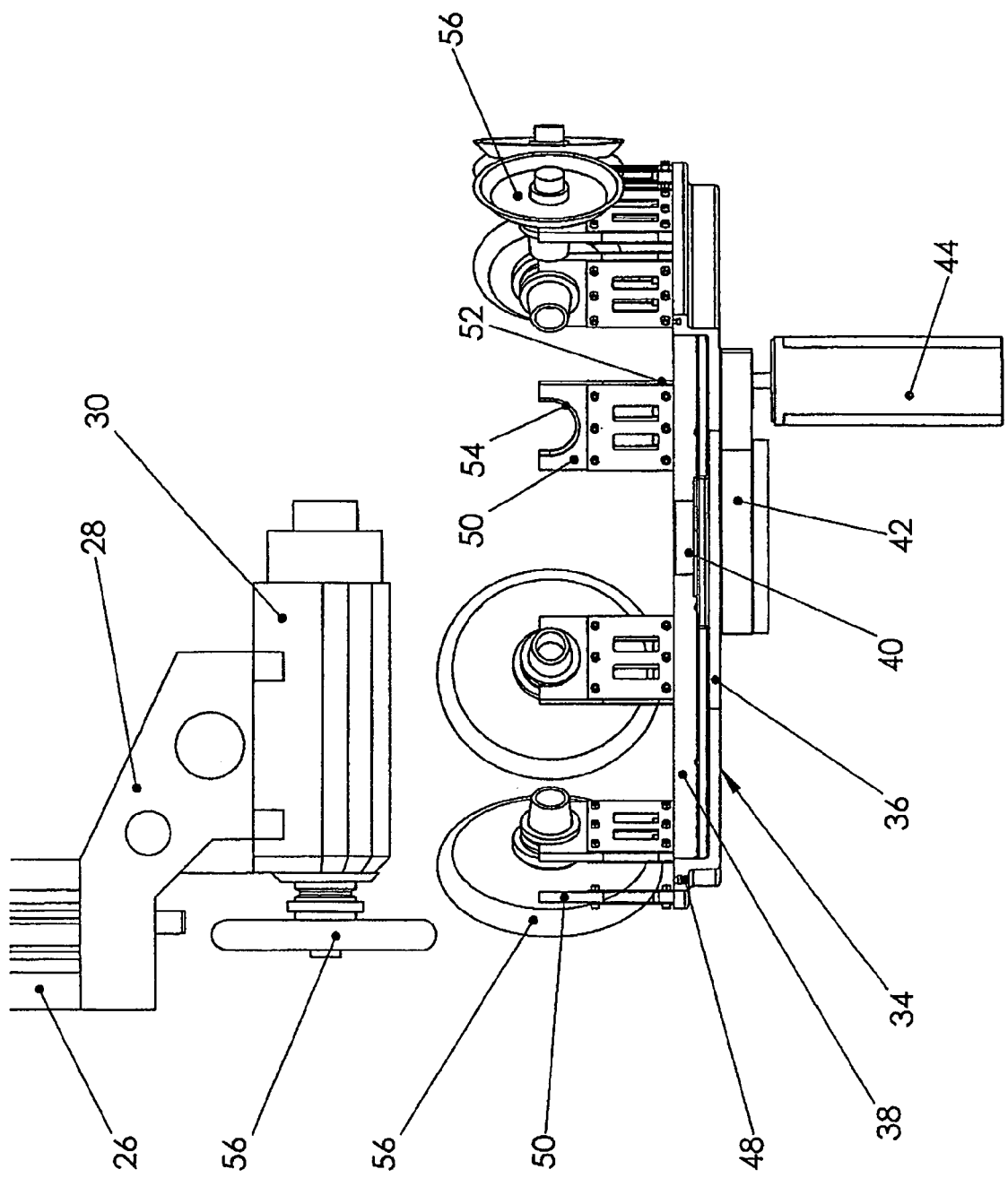
Figure 9:
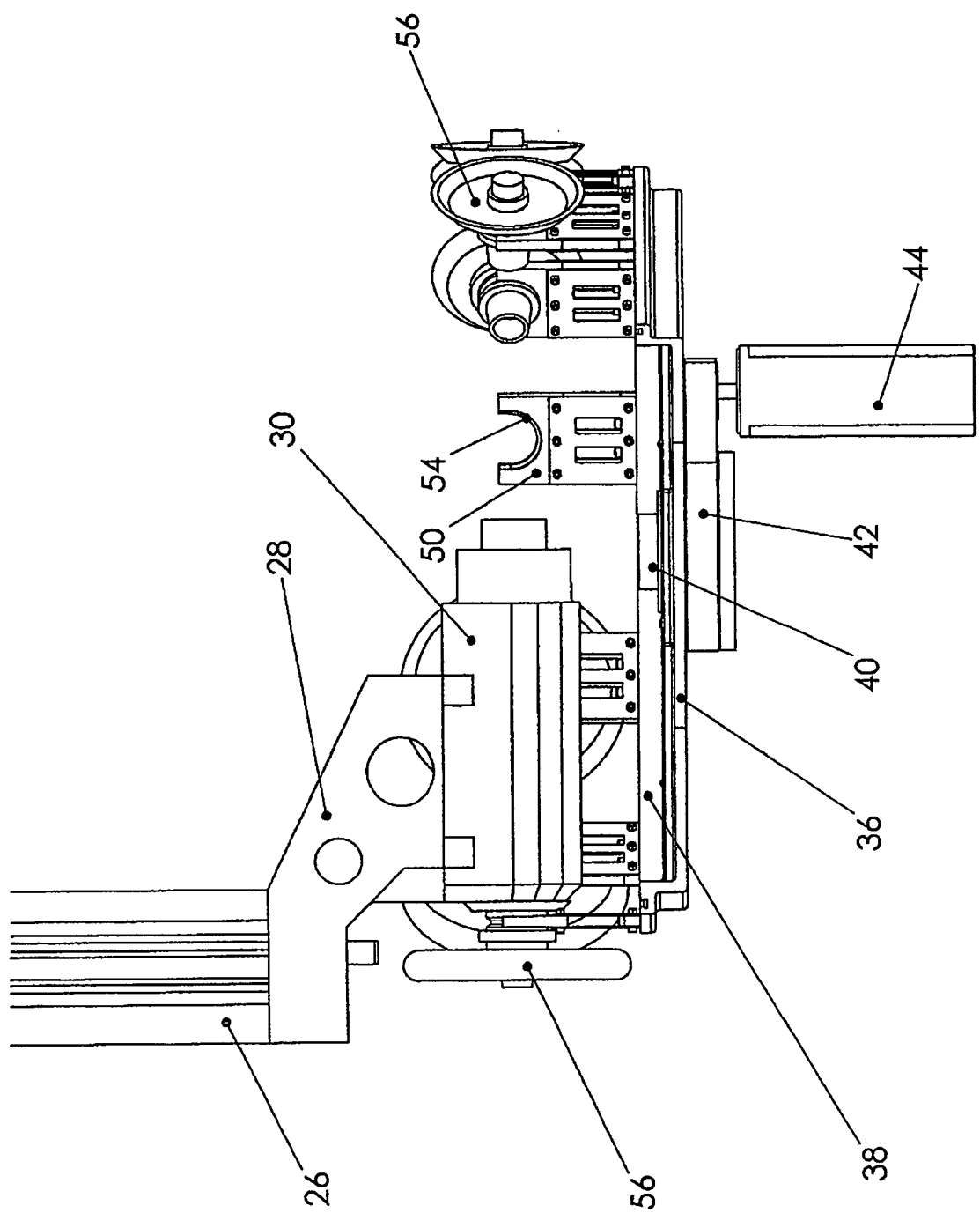
Figure 10:
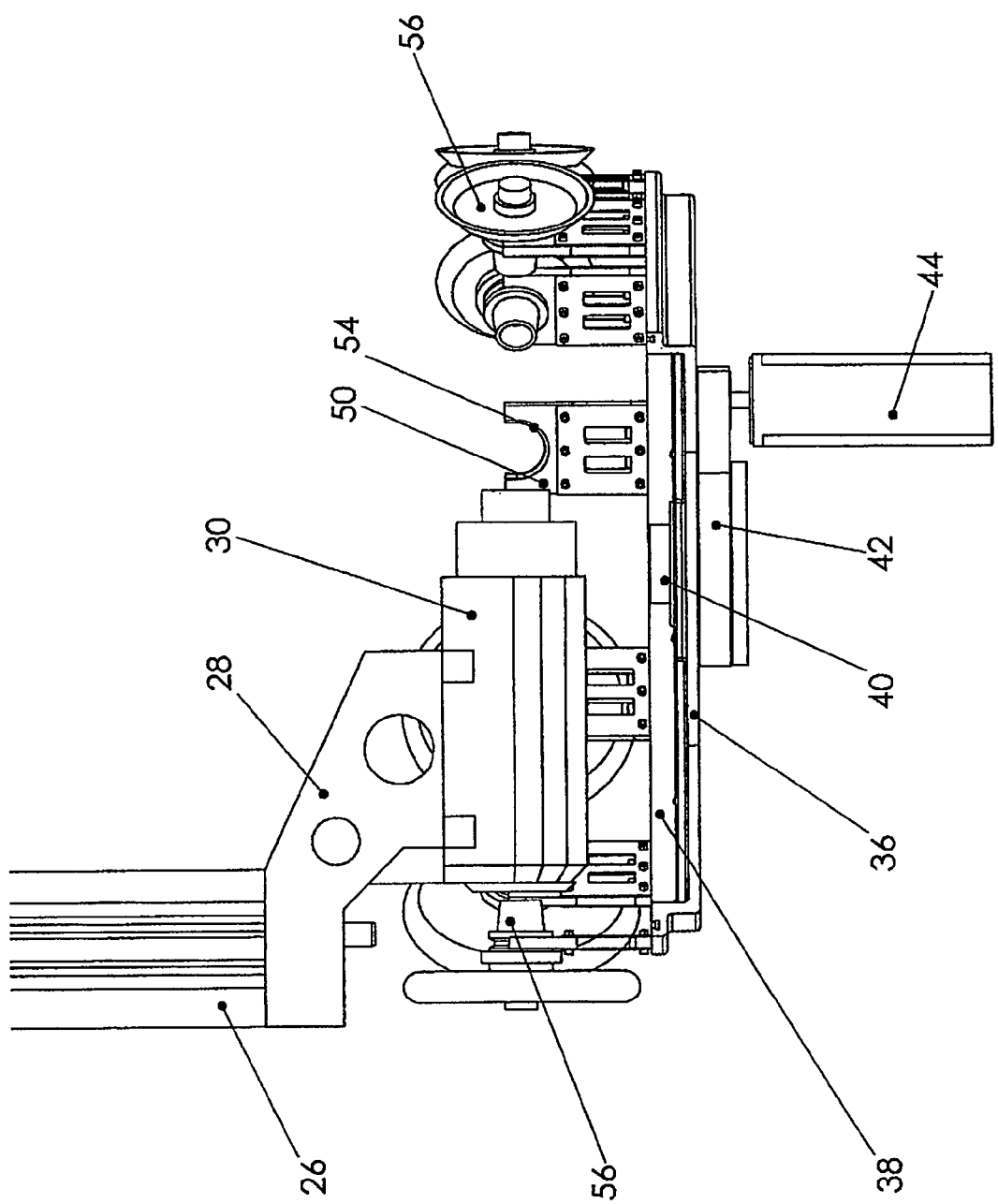
Figure 11:
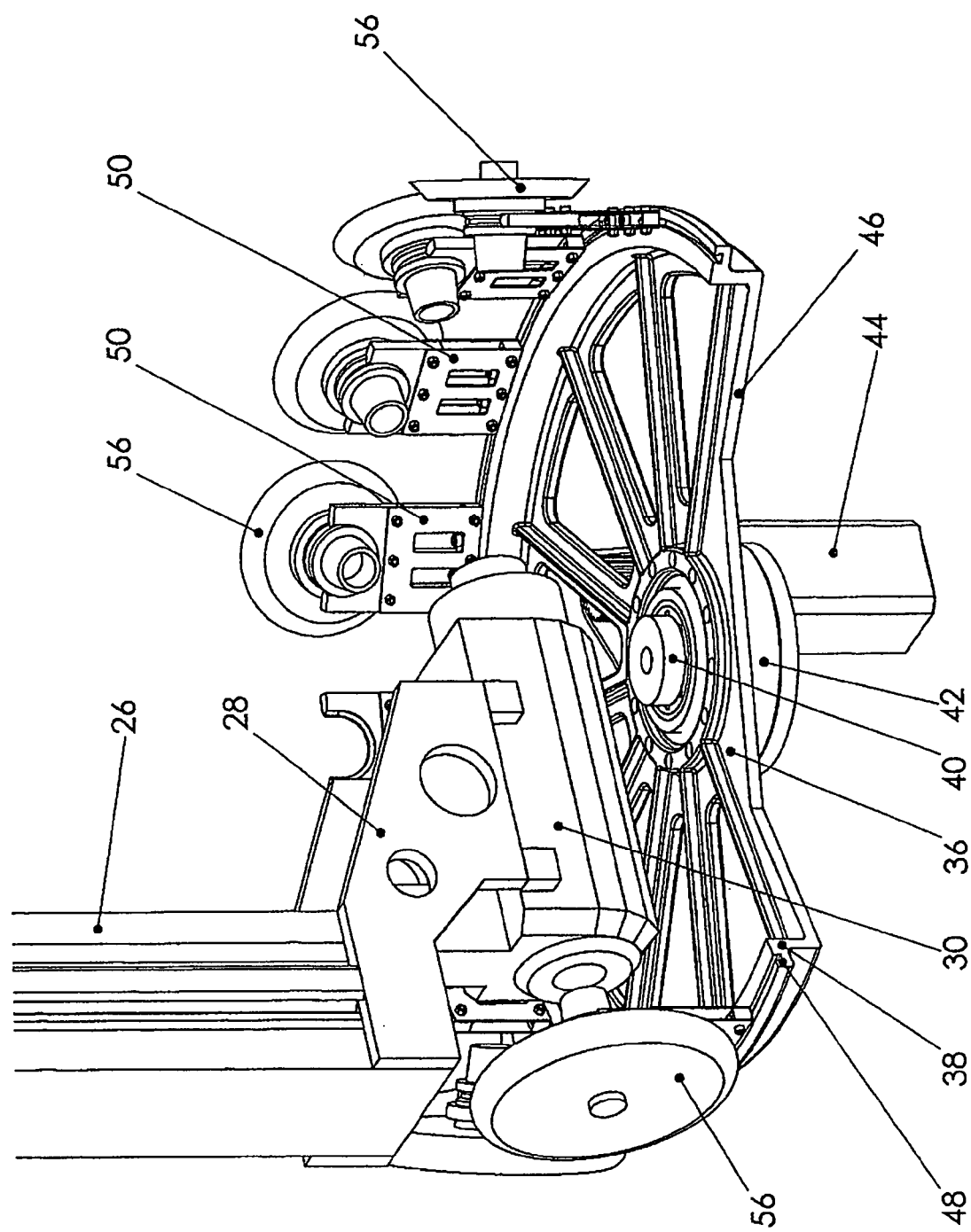

Below, the invention is described in greater detail using an exemplary embodiment illustrated by the drawings, which show FIG. 1 a machine tool in perspective in the operating position, FIG. 2 the same view of the machine tool without the tool spindle in the operating position, FIG. 3 the same depiction of the machine tool without the tool spindle in the exchange position of an outer magazine wheel, FIG. 4 the same depiction of the machine tool in the exchange position of the outer magazine wheel and of the tool spindle, FIG. 5 the same depiction of the machine tool with the tool spindle and an inner magazine wheel in the exchange position, FIG. 6 the same depiction of the machine tool with the tool spindle, a grinding tool of the outer magazine wheel and a grinding wheel protector of the inner magazine wheel in the exchange position, FIG. 7 a detailed depiction of the tool spindle and the outer magazine wheel in perspective, FIGS. 8-10 a side view of the transfer of a tool from the tool spindle to the outer magazine wheel, FIG. 11 a perspective view of the tool spindle and the outer magazine wheel after the delivery of the tool to the outer magazine wheel, FIG. 12 a partial perspective view with the outer magazine wheel, the inner magazine wheel and the tool spindle, FIG. 13 an axial top view of the outer magazine wheel and the inner magazine wheel, FIGS. 14-18 the transfer of a grinding wheel protector to the inner magazine wheel, FIGS. 19-24 a simplified representation of the simultaneous acceptance of a grinding tool and a grinding wheel protector by the tool spindle.

In the embodiment shown, the machine tool is shown exemplarily as a grinding machine. It is readily evident and observable via the following description that the invention can also be used for other machine tools, especially drilling machines, milling machines and lathes.

As FIGS. 1 to 6 show, the machine tool has a horizontal machine bed 10, on which a work piece spindle 12 is mounted to be horizontally displaceable along the X-axis. The work piece spindle 12 is positioned horizontally along the X-axis and is rotatively powered by a work piece spindle drive 14. A work piece 16, which is possibly supported by a tailstock 18, can be clamped to the work piece spindle. Vertically upward directed side walls 20 are respectively positioned on both sides of the machine bed 10. A Y-guide rail 22 is located along the Y-axis on the horizontal top sides of each of the side walls 20. A bridge 24, which is displaceable along the Y-axis via a steered drive and which spans the work space of the machine tool between the side walls 20, is mounted on these Y-guide rails 22. A Z-slide 26, which is displaceable along the vertical Z-axis via a controlled drive and is rotatable about its vertical axis (C-axis) via a controlled drive, is mounted at the center in the bridge 24. At the lower end of the Z-slide 26, a support 28 is attached, on which a rotatively drivable tool spindle 30 with a horizontal axis, which is displaceable along the horizontal axis in a controlled manner, is mounted.

To this point, the construction of the machine tool corresponds to the machine tool described in the German patent application 10 2006 011 551.1 and reference is made to the entire content of this patent application for purposes of disclosure.

In FIG. 1, the tool spindle 30 is in the working position, in which a tool carried by the tool spindle 30 operates on the work piece 16. The tool is, for example, a grinding wheel for grinding the work piece 16. In FIG. 2, the bridge 24 and the Z-slide 26 with the tool spindle 30 are omitted to improve recognizability. It is evident that the working space is, e.g. polygonally, hollowed out from the back side opposite the operator side (the front in FIGS. 1 to 6) toward the rear in order to allow the horizontal tool spindle 30 to rotate about the vertical rotational axis (C-axis). The back side of the work space is enclosed by partitions 32 which can be moved away. The tool magazine, which is described below and in which the tools are stored and are pre-positioned for transfer into the tool spindle 30, is located behind these partitions 32.

FIGS. 7 to 11 show a simple design of the tool magazine.

The tool magazine has a magazine wheel 34, which is rotatatively driven under control about a vertical axis parallel to the Z-axis. The magazine wheel 34 consists of a circular magazine disk 36 lying in the horizontal plane, on whose outer circumference a magazine ring 38 pointing vertically upward is located. The magazine disk 36 can be designed as a closed disk, but is preferably configured as a disk with spokes, as shown in the drawing. The magazine disk 36 sits centrally on a vertical drive shaft 40, which is drivable below the magazine disk 36 by a toothed belt 42 of an NC controlled motor 44.

The magazine disk 36 and thus the entire magazine wheel 34 is configured with a segment-shaped cutout 46 over an angular interval. The shape of this cutout 46 corresponds to the polygonal shape of the partitions 32. If the magazine wheel 34 is aligned in its rotational position so that the cutout 46 faces the work space, then the partitions 32 can be moved into the closed position within this cutout 46. If the partitions 32 are moved back to their open position, the magazine wheel 34 can be rotated about its vertical axis and reaches into the work space of the machine tool with its periphery. These two positions are shown in FIGS. 2 and 3. The design of the magazine wheel 34 with the segment-like cutout 46 makes it possible to place the drive shaft 40 structurally close to the work area, which is hollowed out toward the back, so that the surface area of the machine tool is hardly increased by the tool magazine.

In the upper edge of the magazine ring 38, a coaxially circumferential T-groove is machined into the magazine ring 38. Tool holders 50, which are mounted on the magazine ring 38 with a foot 52 and fit in the T-groove 48, are assembled into this T-groove 48. With this foot 52, the tool holders 50 can be displaced in the T-groove in the circumferential direction of the magazine ring 38 and clamped in the desired position. The tool holders 50 point vertically upward from the foot 52 and each of them forms a U-shaped mounting 54 for a tool, which opens upward. The mountings 54 are configured according to the tools they are to receive. The present exemplary embodiment shows tools 56 in the form of grinding wheels, which have a standardized tapered shaft for a hollow tapered shaft tool mounting. The mounting 54 is configured so that the tool 56 can be placed into the mounting 54 from above, whereby the tool holder 50 fits with its mounting 54 in the gripping groove of the tapered shaft. The tool 56 is held securely in the mounting 54 by its own weight, without additional fastenings, and latched against centrifugal forces and tilting effects. The tools 56 are assembled into the tool holders 50 so that their tapered shafts are directed radially inward from the magazine ring 38, while the actual tool is directed radially outward. Since the diameter of the actual tool is usually larger than the diameter of the tapered shaft, this results in an optimal utilization of space of the magazine periphery. The tool holders 50 can be displaced in the T-groove 48 in the circumferential direction of the magazine ring 38 and arranged with angular spacings so that optimal utilization of the periphery of the magazine wheel 34 is achieved, in accordance with the diameter of the respective tools 56. The tool holders 50 are clamped and fixed in the T-groove 48 of the magazine ring 38 in the-respectively optimized angular positions. The positions of the tool holders 50 are stored as angular values in the controls of the motor 44 and can be changed and adjusted according to the respective application.

Tool exchange is described using FIGS. 7 to 11.

Figure 7:
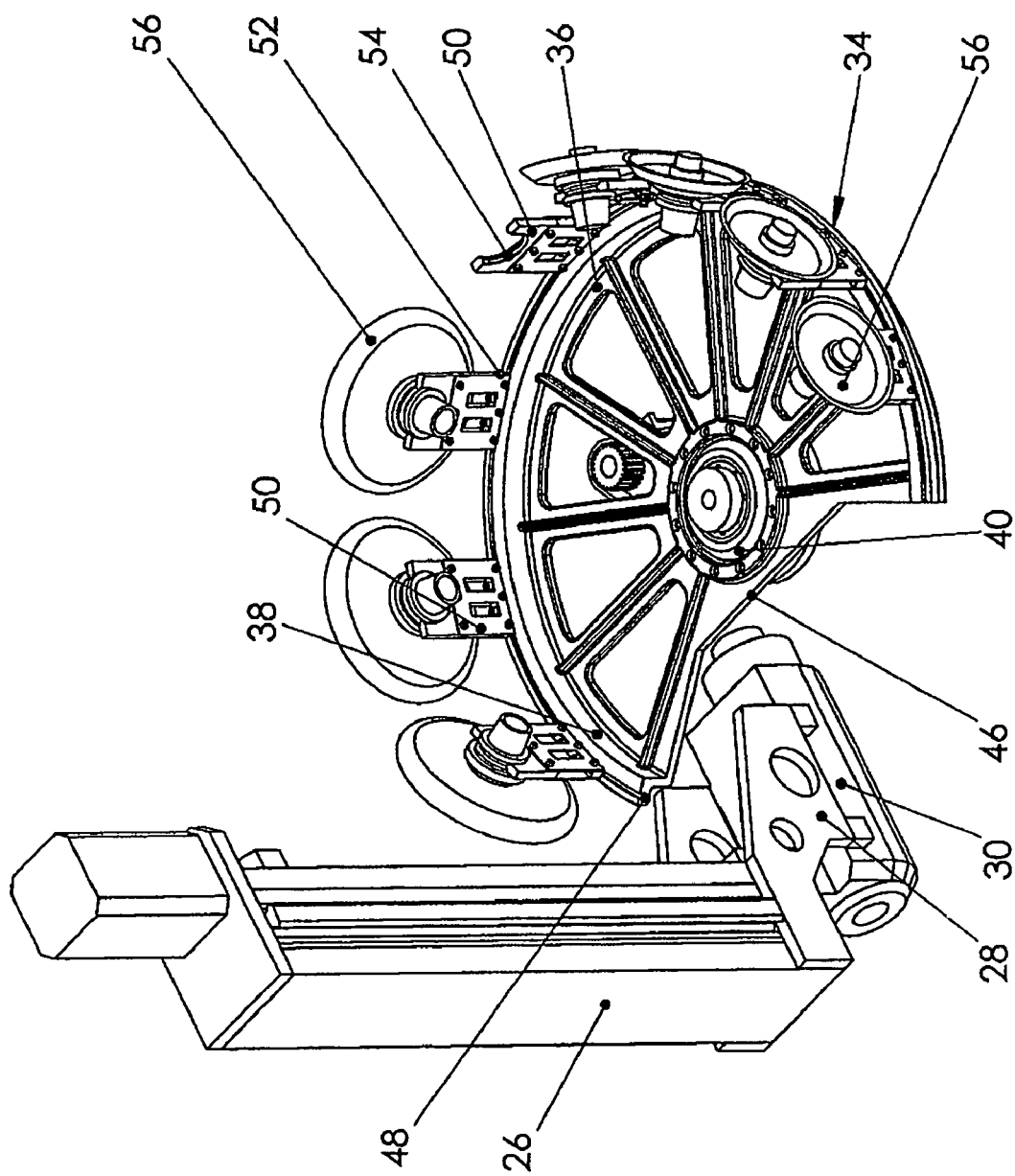

FIG. 7 shows the operating position of the machine tool. The magazine wheel 34 is in the position shown in FIG. 2, in which the cutout 46 coincides with the position of the partitions 32. In the region of this cutout 46, the magazine wheel 34 is shielded from the work space by the partitions 32, not shown in FIG. 7. The processing of a work piece 16 can be accomplished. The work piece 16 is moved on the machine bed 10 along the x-axis, while it can also possibly be turned around its own axis (A-axis). The tool 56 is clamped in the tool spindle 30. The tool 56 undergoes a vertical movement by means of the Z-slide 26, while the horizontal axis of the tool spindle 30 is rotatable around the vertical axis of the Z-slide 26. The Z-slide 26 can be moved along the Y-axis by means of the bridge 24. The tool spindle 30 can additionally be moved horizontally in the support 28, along its axis, with respect to the Z-slide 26. If necessary, the angle of inclination of the axis of the tool spindle 30 can also be additionally adjusted with respect to the horizontal plane.

To accomplish a tool exchange, the partitions 32 are first moved away so that the magazine wheel 34 can turn into the work space. As FIG. 8 shows, the magazine wheel 34 is turned via the drive control of the motor 44, so that a free tool holder 50' is carried into the exchange position, i.e. positioned in the plane of Y-motion of the Z-slide 26. The Z-slide 26 is turned so that the support 28 with the tool spindle 30 is likewise aligned in this plane. The bridge 24 now moves to the rear along the Y-axis until the tool spindle 30 is located above the magazine wheel 34 and within the circumference of the magazine ring 38, as shown in FIG. 8. The z-slide 26 is then moved vertically downwards, whereby the tool 56 is placed into the mounting 54 of the open tool holder 50' with its gripping groove, as shown in FIG. 9. Thereafter, the Z-slide 26 moves further to the rear along the Y-axis, whereby the tool spindle 30 is moved radially inward by the magazine ring 38 and the HSK mounting of the tool spindle 30 releases the tapered shaft of the tool 56 as shown in FIGS. 10 and 11. Alternatively to a displacement of the Z-slide 26 along the Y-axis, it is also possible to move the tool spindle 30 in the support 28. In the position shown in FIGS. 10 and 11, the magazine wheel 34 can now be turned via the motor 44, until the next selected tool 56 is radially positioned in the exchange position in front of the tool receptacle of the tool spindle 30. In this position, the tool spindle 30 is again pushed radially outward by means of the Z-slide 26, whereby its tool receptacle shifts itself onto the tapered shaft of the now positioned next tool and clamps onto the latter. The tool spindle 30 with the next clamped tool 56 is now moved upward by means of the Z-slide 26, whereby the tool 56 is lifted out of the tool holder 50. As soon as the tool spindle 30 with the tool 56 is located above the magazine ring 38, the tool spindle 30 again can be moved into the operating position. The magazine wheel 34 is again turned back to the initial position shown in FIGS. 2 and 7, the partitions 32 are closed and the processing of the work piece 16 with the new tool 56 can begin.

Figure 12:
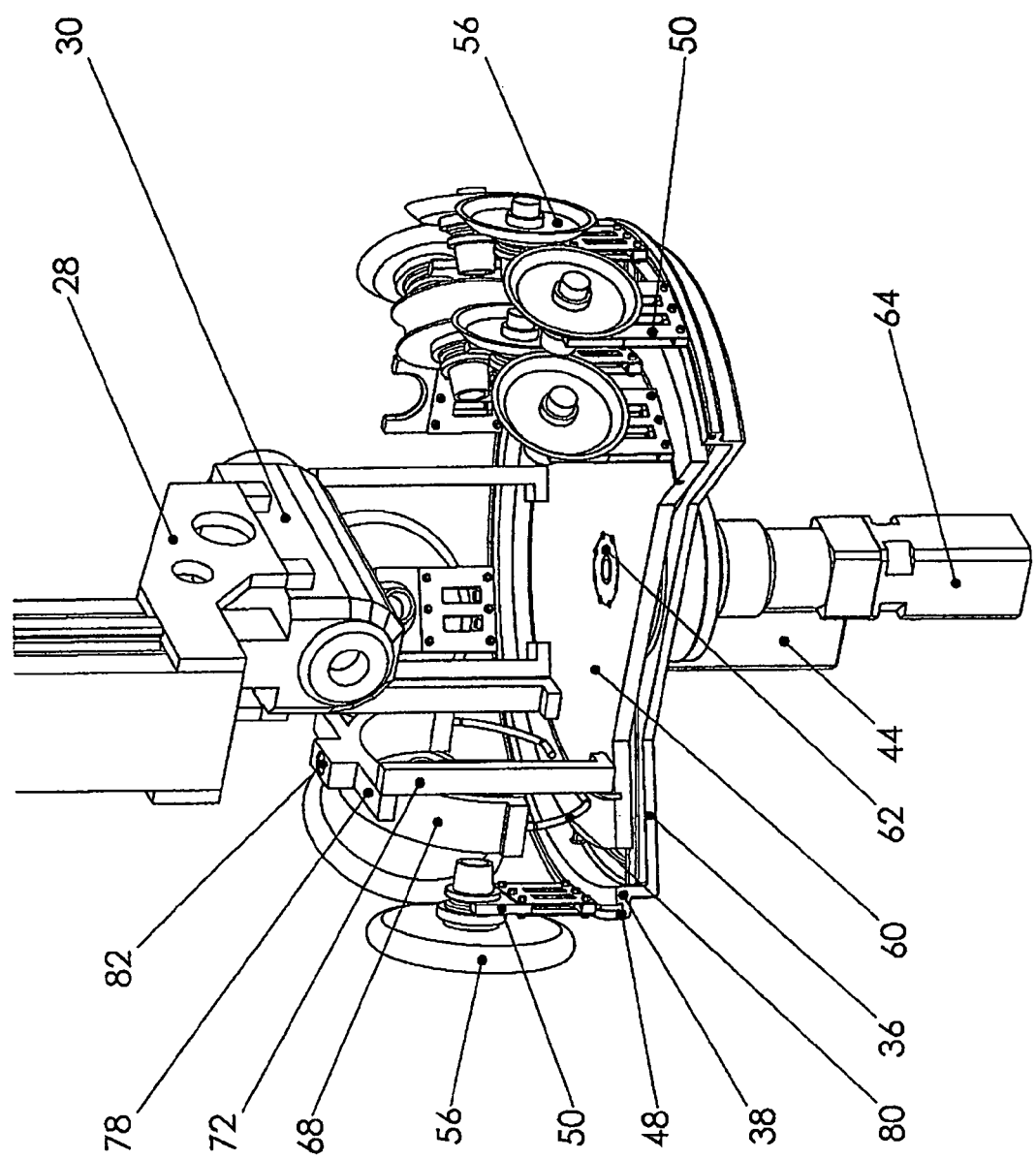
Figure 13:
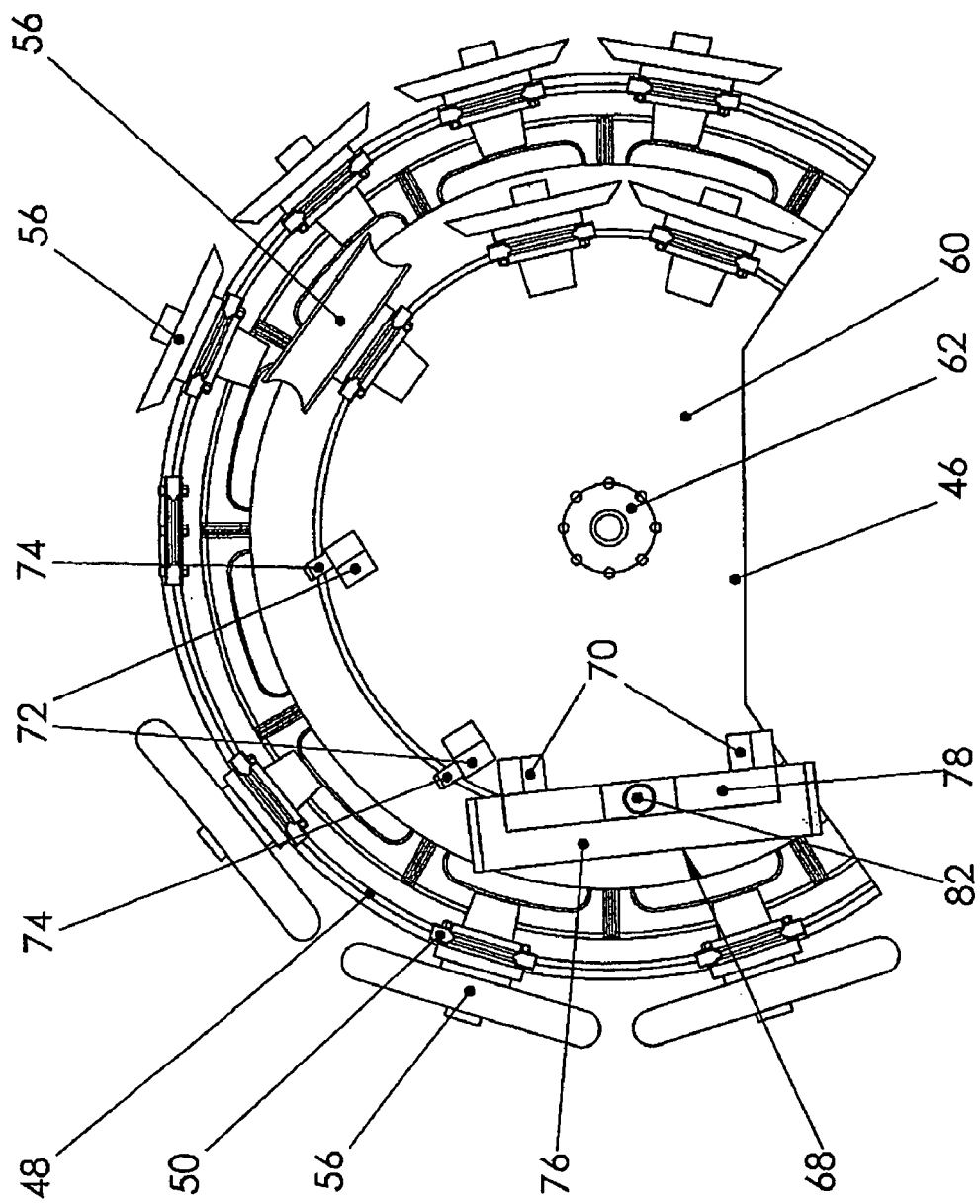

The tool magazine furthermore has a second inner magazine wheel 58 in addition to the first outer magazine wheel 34, as shown in particular in FIGS. 12 and 13.

The inner magazine wheel 58 is disposed coaxially with the outer magazine wheel 34 and has a magazine disk 60, which is positioned concentrically and in parallel with the magazine disk 36 of the outer magazine wheel 34. The outside diameter of the magazine disk 60 is smaller than the inside diameter of the magazine ring 38 of the outer magazine wheel 34. The inside magazine wheel 58 is freely rotatable with respect to the outer magazine wheel 34. For this purpose, the magazine disk 60 of the inner magazine wheel 58 has a vertical central drive shaft 62, which is mounted in a coaxially rotatable manner in the drive shaft 40 of the outer magazine wheel 34 configured as a hollow shaft. The inner magazine wheel 58 is drivable via its drive shaft 62, independent of the outer magazine wheel 34, by means of an NC controlled motor 64 located below the outer magazine wheel 34.

Figure 5:
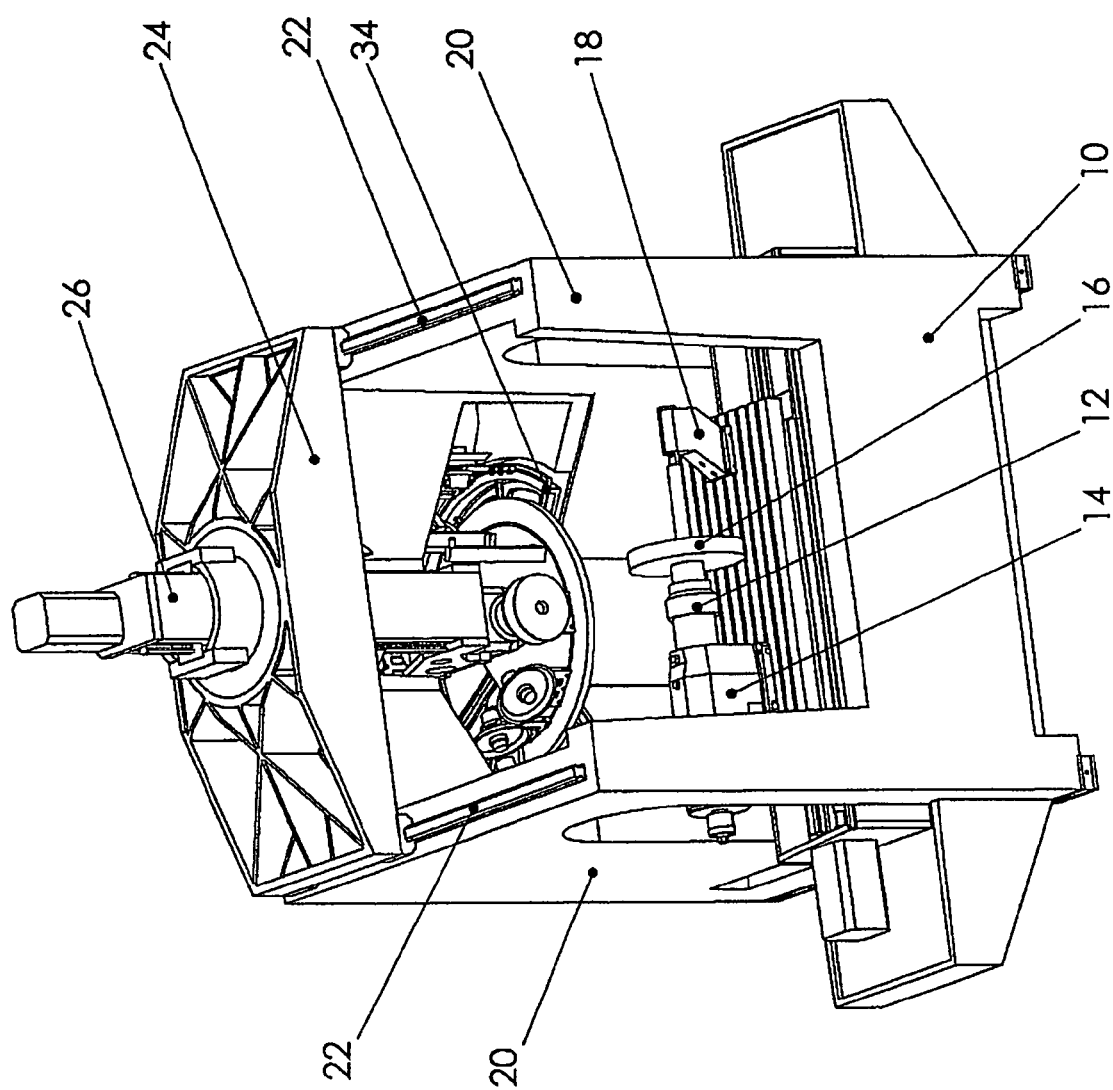
Figure 6:
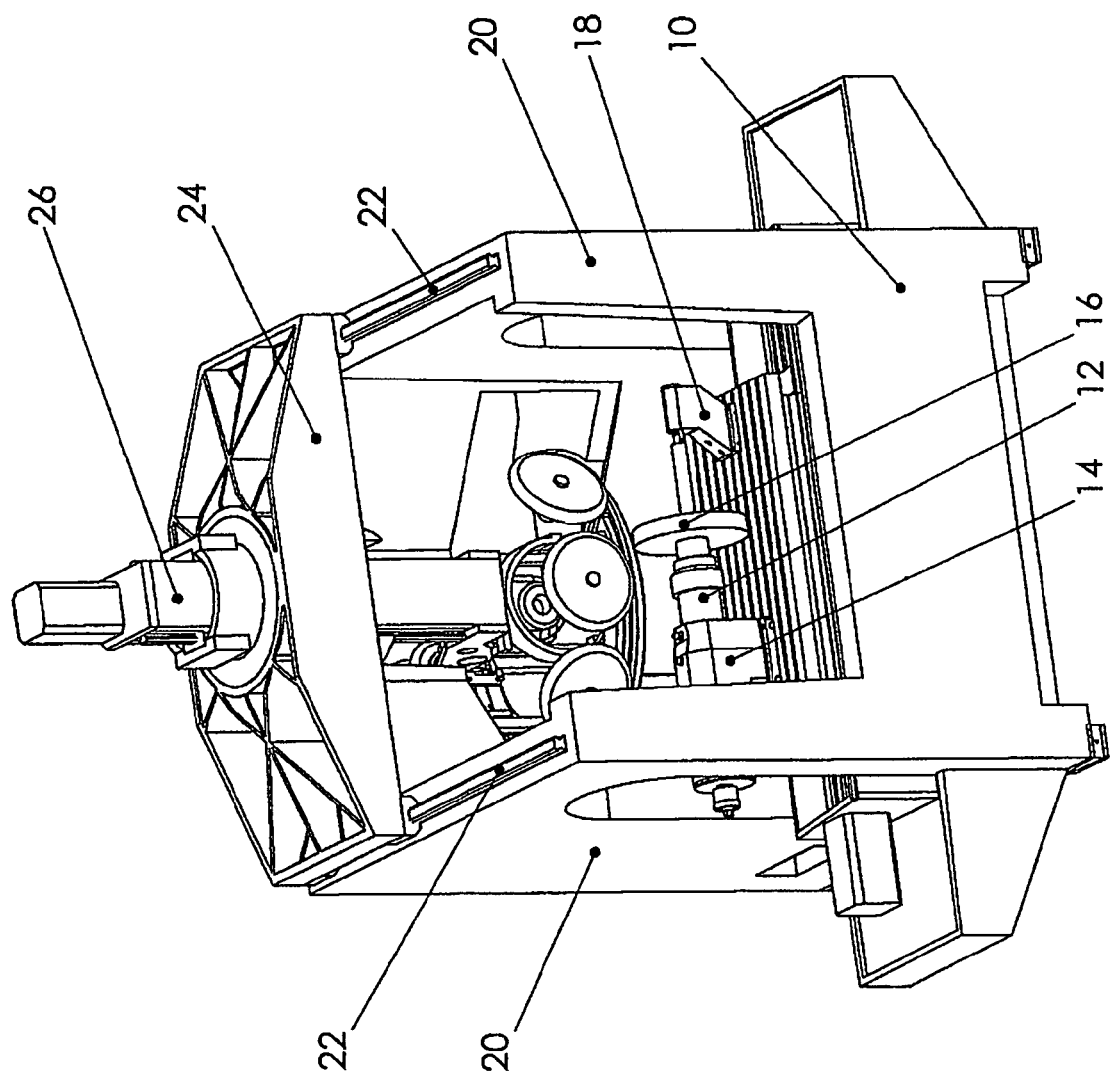

As FIG. 5 shows, the inner magazine wheel 38 can be essentially configured similar to the outside magazine wheel 34. A magazine ring, in which tool holders can be arranged in their adjustable angular positions and clamped, runs concentrically on the top side of the magazine disk 60. The magazine ring and the tool holders can be designed in a corresponding manner, as described above for the outer magazine wheel 34. The magazine ring with the tool holders is however—as FIG. 5 shows—designed with a smaller radius than the magazine disk 60, so that a radial distance remains free between the magazine ring of the inner magazine wheel 58 and the magazine ring 38 of the outer magazine wheel 34, which is required for mounting the tools 56 stored in the inner magazine wheel 58.

The withdrawal and delivery of the tools 56 into the inner magazine wheel 58 occurs in the same manner as described above for the outer magazine wheel 34. The inner magazine wheel 58 also has a cutout 46, which is congruent with the cutout 46 of the outer magazine wheel 34 during an angular alignment of the outer magazine wheel 34 with the inner magazine wheel 58. In particular, the magazine ring of the inner magazine wheel 58 also has a corresponding angular cutout, so that, by means of this cutout in the magazine ring of the inner magazine wheel 58, the tools 56 in the outer magazine wheel 34 are freely accessible to the tool spindle 30 in the manner described above.

Because of the independently controlled adjustability of the rotary positions of the outer magazine wheel 34 and the inner magazine wheel 58, they can be independently brought into the exchange position, and tools 56 can be alternatively exchanged into and from the outer magazine wheel 34 or the inner magazine wheel 58 in an arbitrarily programmable manner. The inner magazine wheel 58 thus increases the number of the tool storage places of the entire tool magazine without increasing the external dimensions of the tool magazine.

A particular use of the inner magazine wheel 58 is shown in FIGS. 12 and 13. In this embodiment, the tool magazine serves the purpose of holding both machining tools 56, especially grinding wheels, and associated safety devices, in particular grinding wheel protectors, at the ready for exchanging one for the other. As FIGS. 12 and 13 show, in this embodiment, the tools 56 are held at the ready, in the manner described above, in the outer magazine wheel 34. The inner magazine wheel 58 carries the safety devices, which are in particular in the form of grinding wheel protectors.

FIGS. 14 to 18 show the exchange of such a grinding wheel protector 68. For purposes of greater intelligibility, only the inner magazine wheel 58 of the complete magazine shown in FIGS. 12 and 13 is shown, while the outer magazine wheel 34 is omitted.

On the magazine disk 60 of the inner magazine wheel 58, protector mountings 70 are attached to the periphery with radial spacing and angularly distanced from each other on a concentric circle. The protector mountings 70 respectively consist of a pair of support arms 72 extending vertically upward from the magazine disk 60, which arms exhibit a mounting mandrel 74 directed radially outward at their respective free upper ends. The distance between the respective two support arms 72 of a protector mounting 70 and the positioning of their mounting mandrels 74 is selected so that a grinding wheel protector 68 can be slid onto these mounting mandrels 74 and carried by them. The grinding wheel protector 68 consists of a protective cover 76, which partly covers the outer circumference of the grinding wheel, a mounting bracket 78 attached on top of the protective cover 76 and possibly coolant nozzles 80. The mounting bracket 78 extends horizontally and essentially tangential to the protective cover 76. Drilled holes for mounting mandrels 74 are provided at both ends of the respective mounting bracket 78. A vertical coupling hole 82 is provided in the center of the top of the mounting bracket 78. A coupling stud 84 extending downward is located on the support 28 of the Z-slide 26 in front of the tool receptacle of the tool spindle 30, which stud cooperates with the coupling hole 82 for purposes of anchoring the grinding wheel protector 68.

Figure 2:
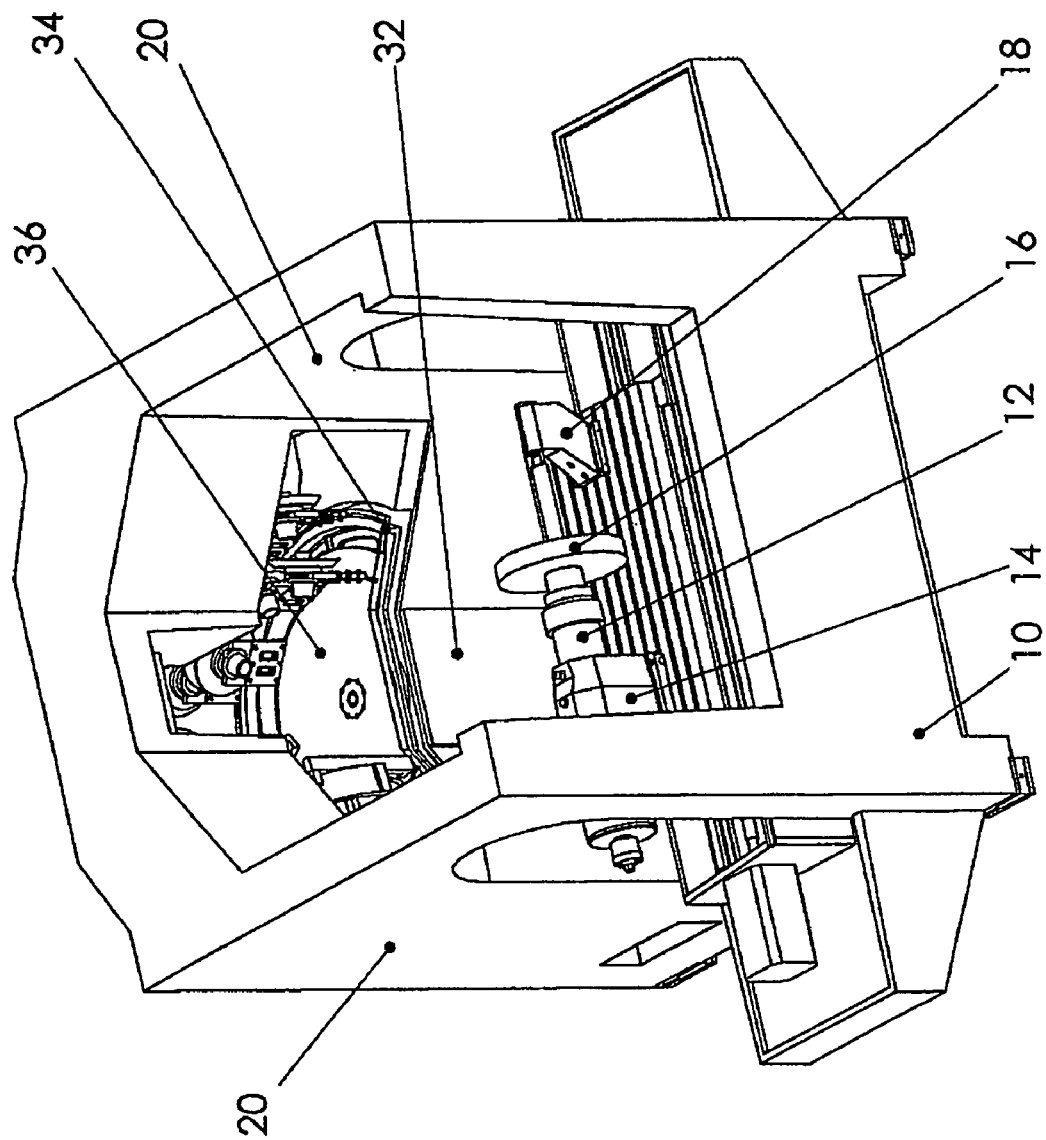
Figure 14:
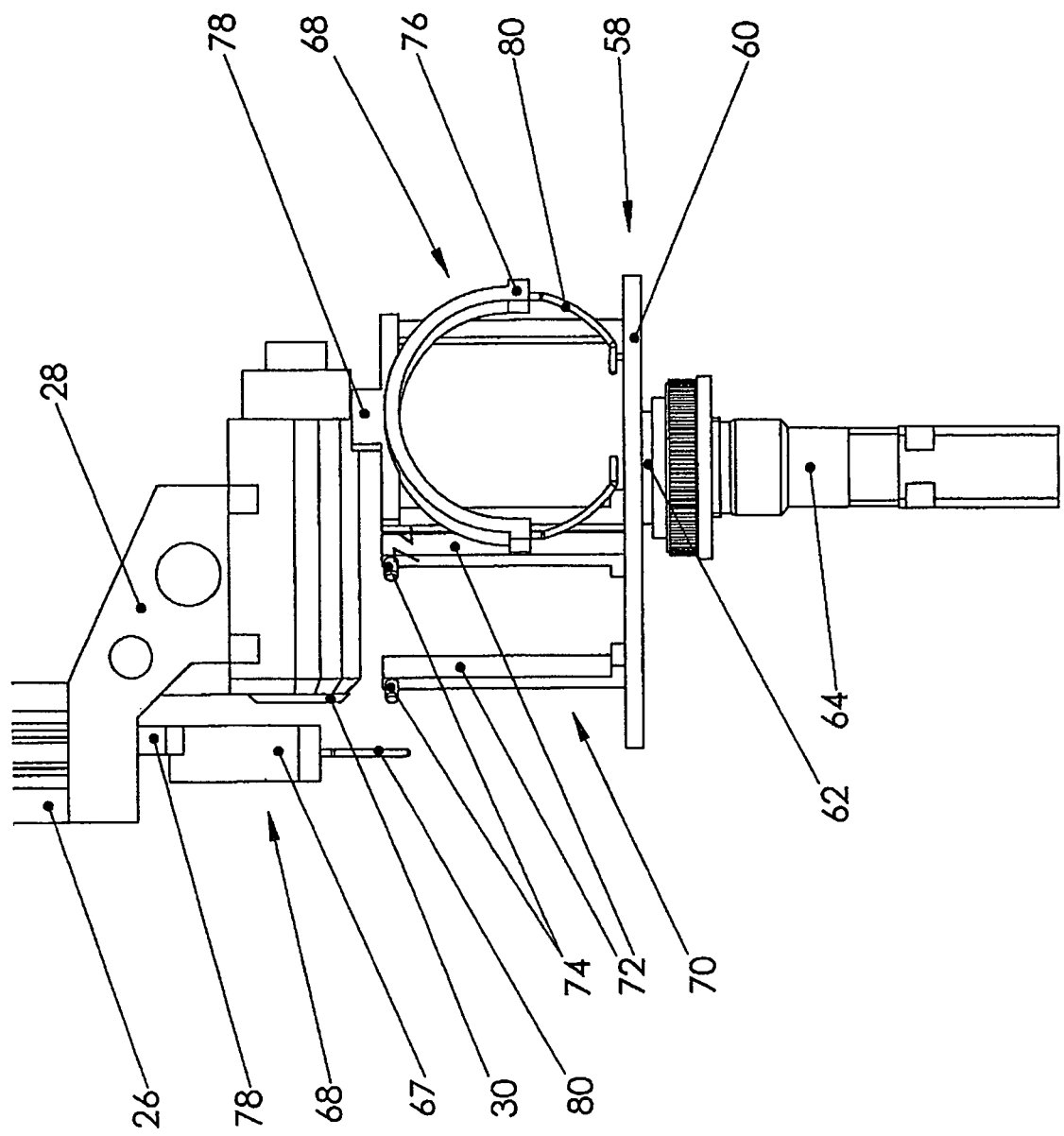

FIG. 14 shows the operating position, in which, according to FIGS. 1 and 2, the grinding wheel protector 68 is locked on the support 28 and covers the grinding wheel, not shown in FIG. 14, with its protective cover 76. A coolant is sprayed onto the work piece which 16 is to be machined by means of the coolant nozzles 80. The magazine wheel 58—like the outer magazine wheel 34 which is not shown—is in the initial position, in which the cutout 46 is covered by the closed partitions 32.

Figure 15:
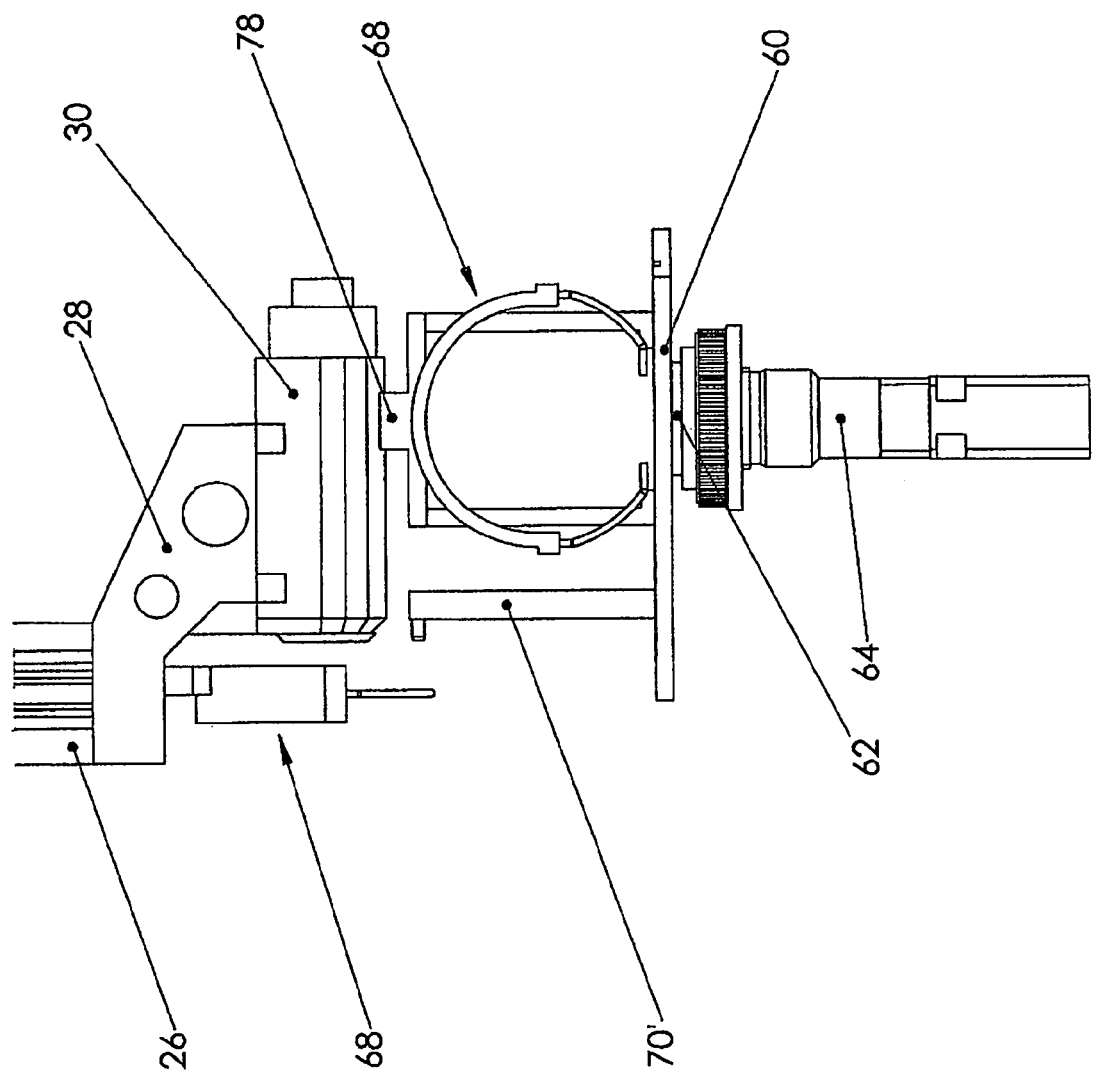

To exchange the grinding wheel protector 68, the internal magazine wheel 58 is turned into the exchange position shown in FIG. 15, after the partitions 32 are opened, in which position a free protector mounting 70' faces the work space and is aligned in the Y-Z-plane of the Z-slide 26.

Figure 16:
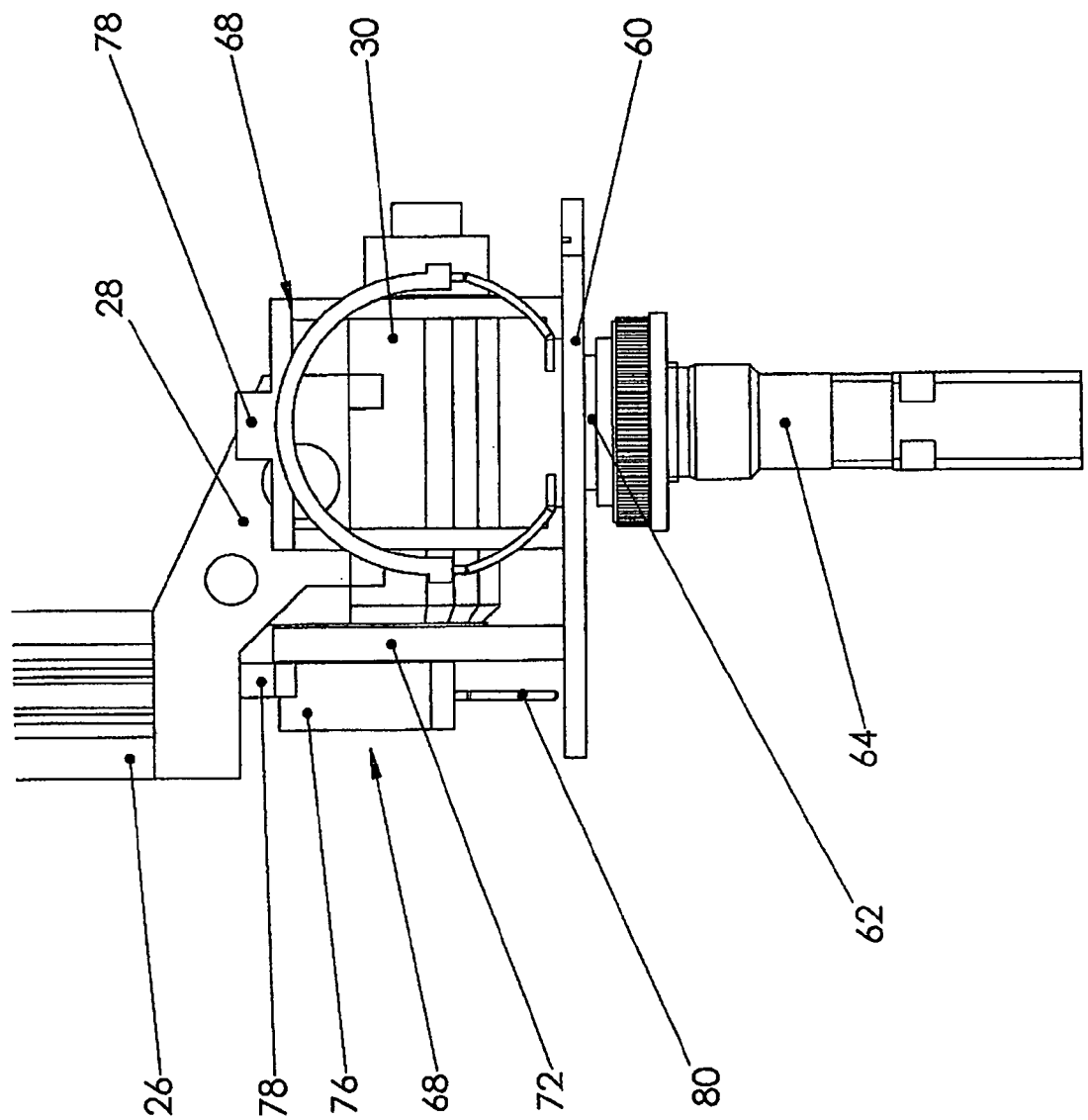

In this position of the magazine wheel 58, the Z-slide 26 is also lowered along with the tool spindle 30 aligned in the Y-Z-plane, until the grinding wheel protector 68 which is locked on the support 28 is aligned in front of the free protector mounting 70'. The Z-slide 26, along with the support 28, is moved to the rear, i.e. to the right in FIG. 16, whereby the mounting bracket 78 of the grinding wheel protector 68 is pushed onto the mounting mandrels 74 of the open protector mounting 70'. This position is shown in FIG. 16.

Figure 17:
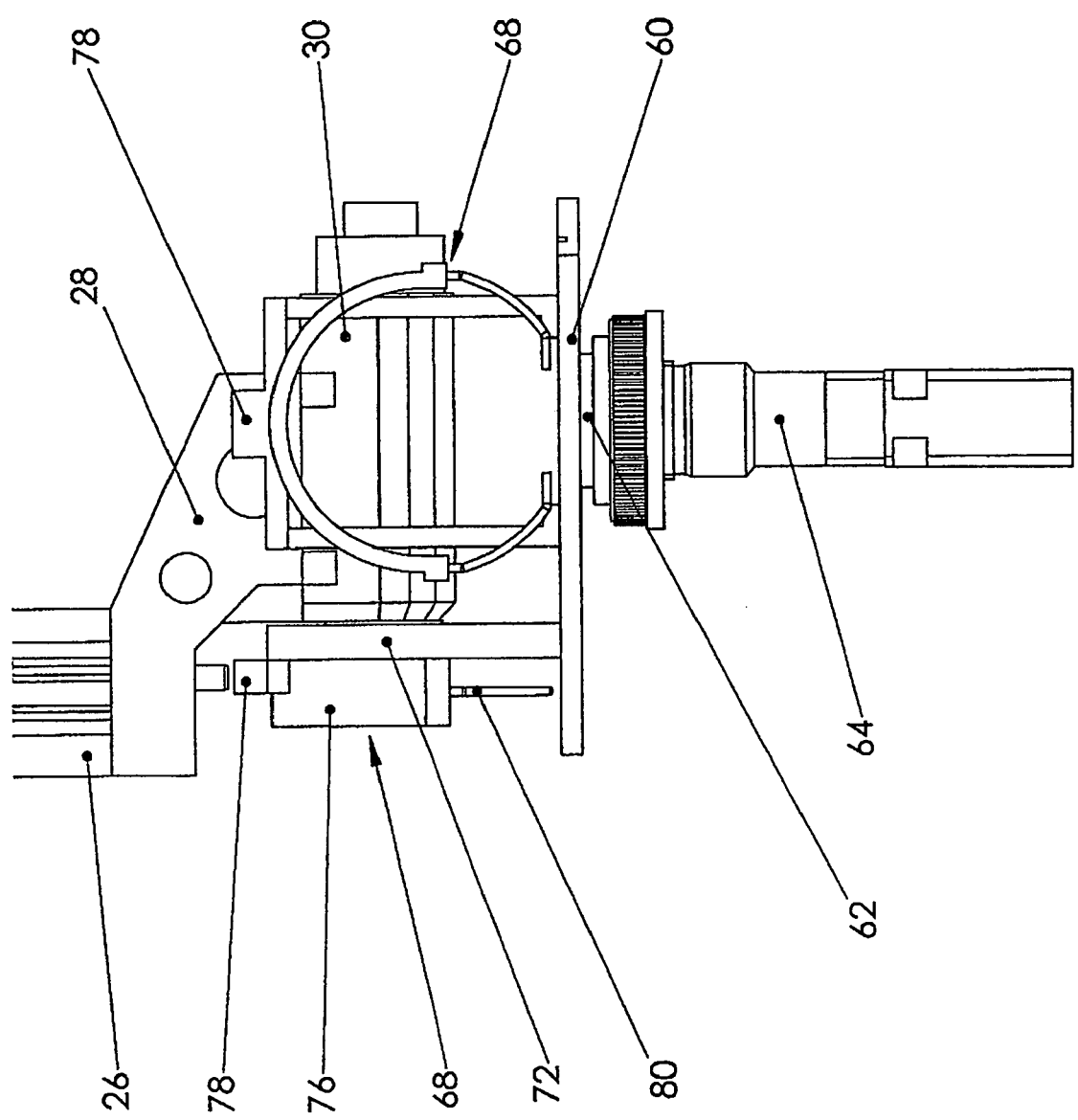
Figure 18:
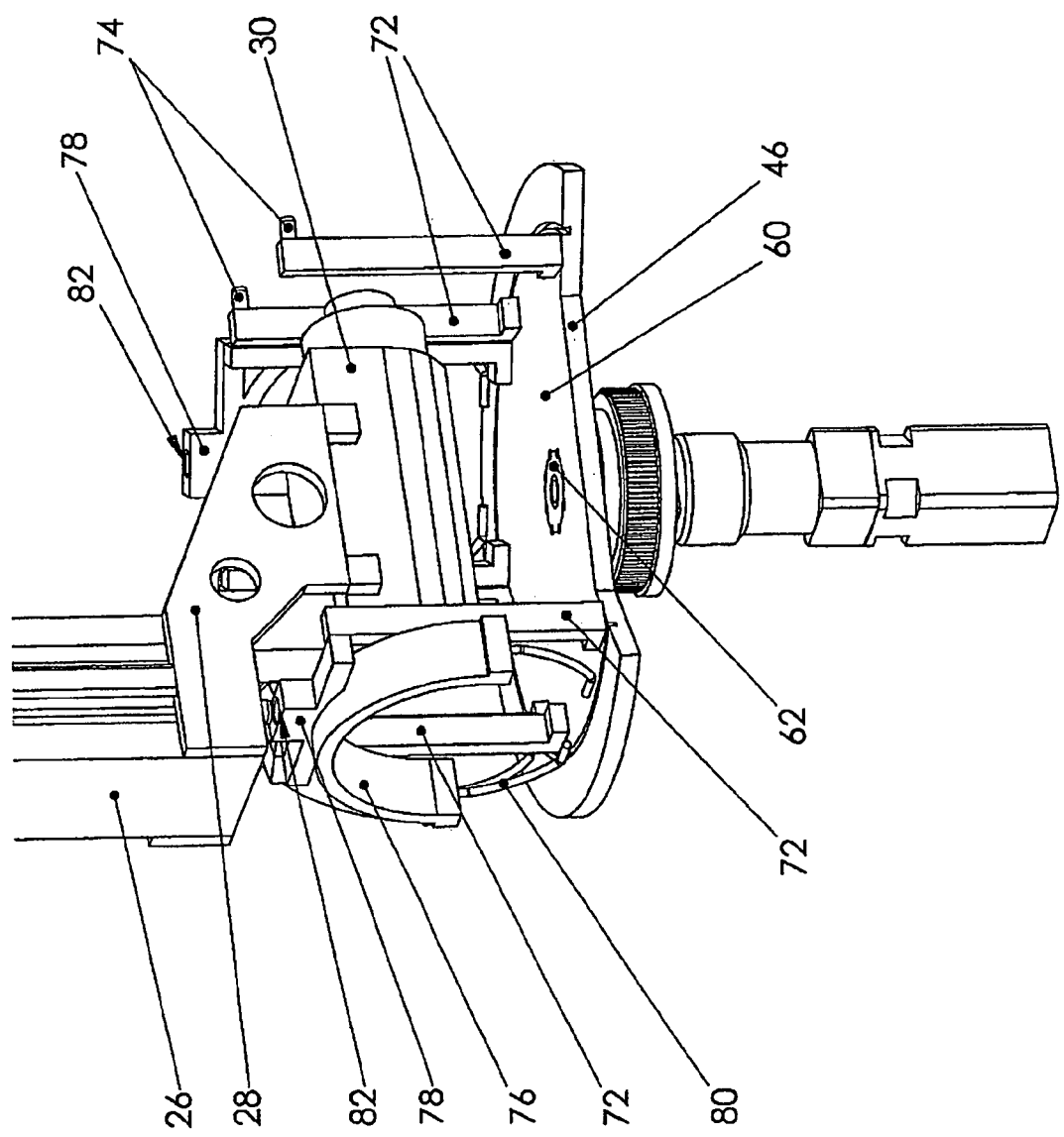

Thereafter, the Z-slide 26 is moved upward vertically, whereby the coupling stud 84 is pulled out of the coupling hole 82 of the grinding wheel protector 68 now sitting in the protector mounting 70. This is shown in FIGS. 17 and 18.

The magazine wheel 58 can now be turned with the tool spindle 30 relative to the support 28, in order to position a grinding wheel protector 68, which is to be subsequently exchanged, into the exchange position in front of the tool spindle 30. Once this has occurred, the support 28 along with the coupling stud 84 is again lowered to couple the now positioned grinding wheel protector 68 which is to be newly exchanged with the support 28. Thereafter the Z-slide 26 along with the support 28 is radially shifted forward, i.e. to the left in the drawing, in order to pull the coupled grinding wheel protector 68 from the mounting mandrels 74, so that the tool spindle 30 can now operate with the newly coupled grinding wheel protector 68.

It is immediately evident from FIGS. 12 and 13 that, due to the ability to rotate the first magazine wheel 34 and the second magazine wheel 58 in an independently controlled manner, the tools 56 and the protector device 68 can be exchanged independently. By this means, different tools 56 can be combined at will with different protector devices 68. If a tool must be replaced with a similar new tool, e.g. as a result of wear, it is possible to exchange only the tool, while the grinding wheel protector does not have to be exchanged.

FIGS. 19 to 24 finally show how a simultaneous exchange of a tool 56 and an associated protector device, e.g. a grinding wheel protector 68, can take place. For purposes of a simple and clear representation, only one tool 56 is shown in the outer magazine wheel 34 and one grinding wheel protector 68 in the inner magazine wheel 58. The remaining tools and grinding wheel protector devices are omitted.

Figure 19:
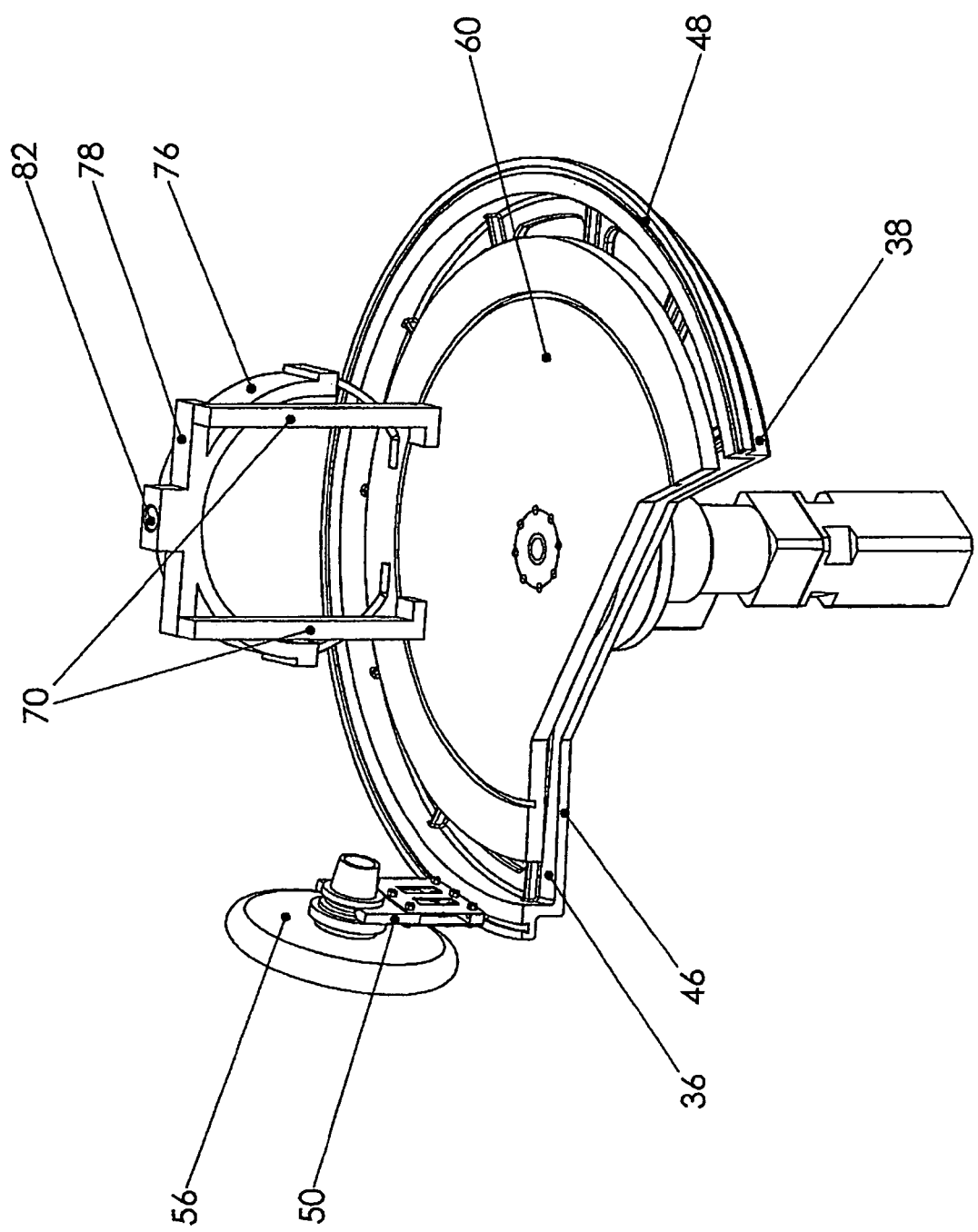
Figure 20:
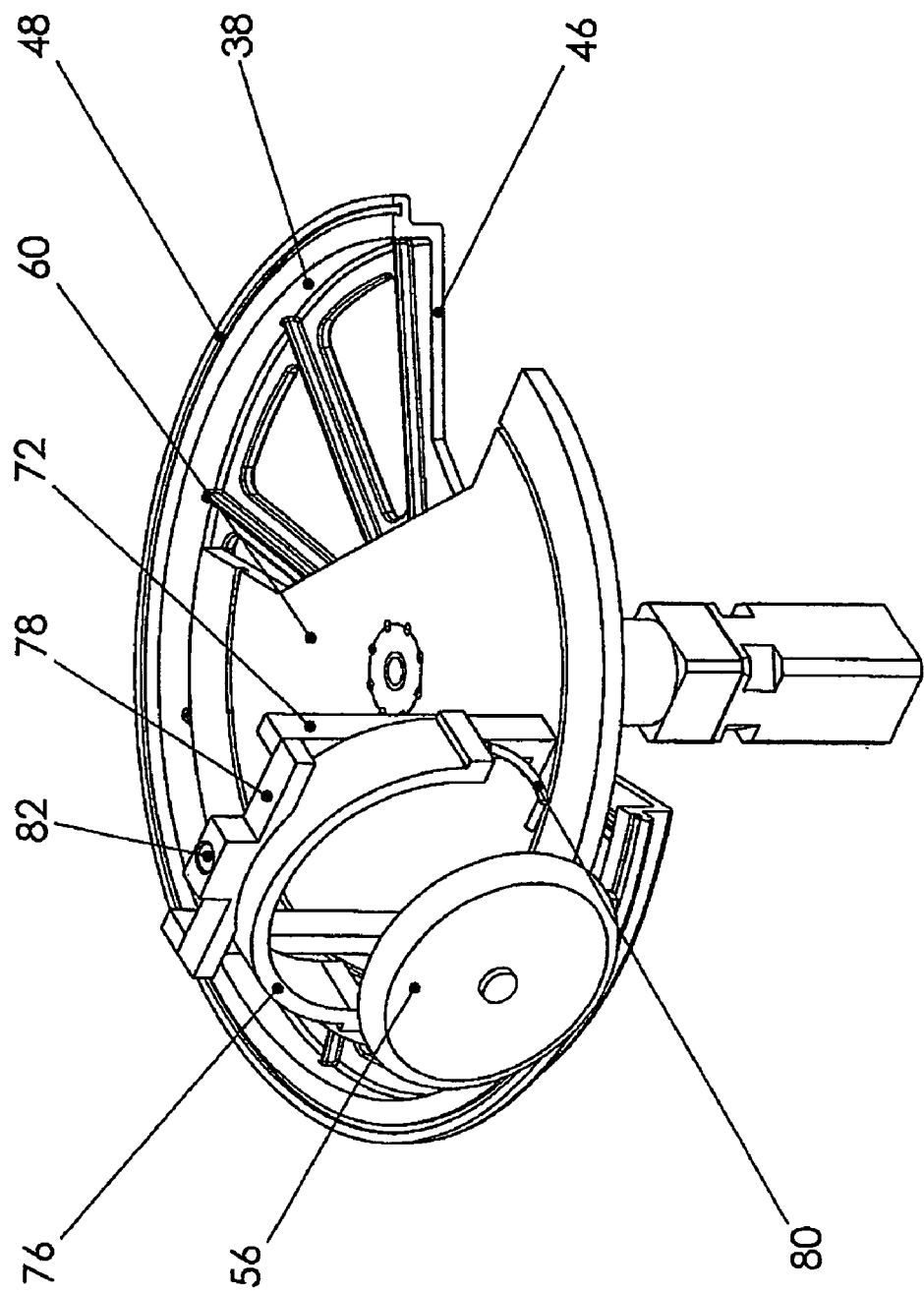

FIG. 19 shows the initial position, during the work piece processing time. After completion of the processing and after opening the partitions 32, the tool 56 and the associated grinding wheel protector 68, which are to be exchanged, are positioned in the radially aligned change position directed toward the work space, as shown in FIG. 20.

Figure 21:
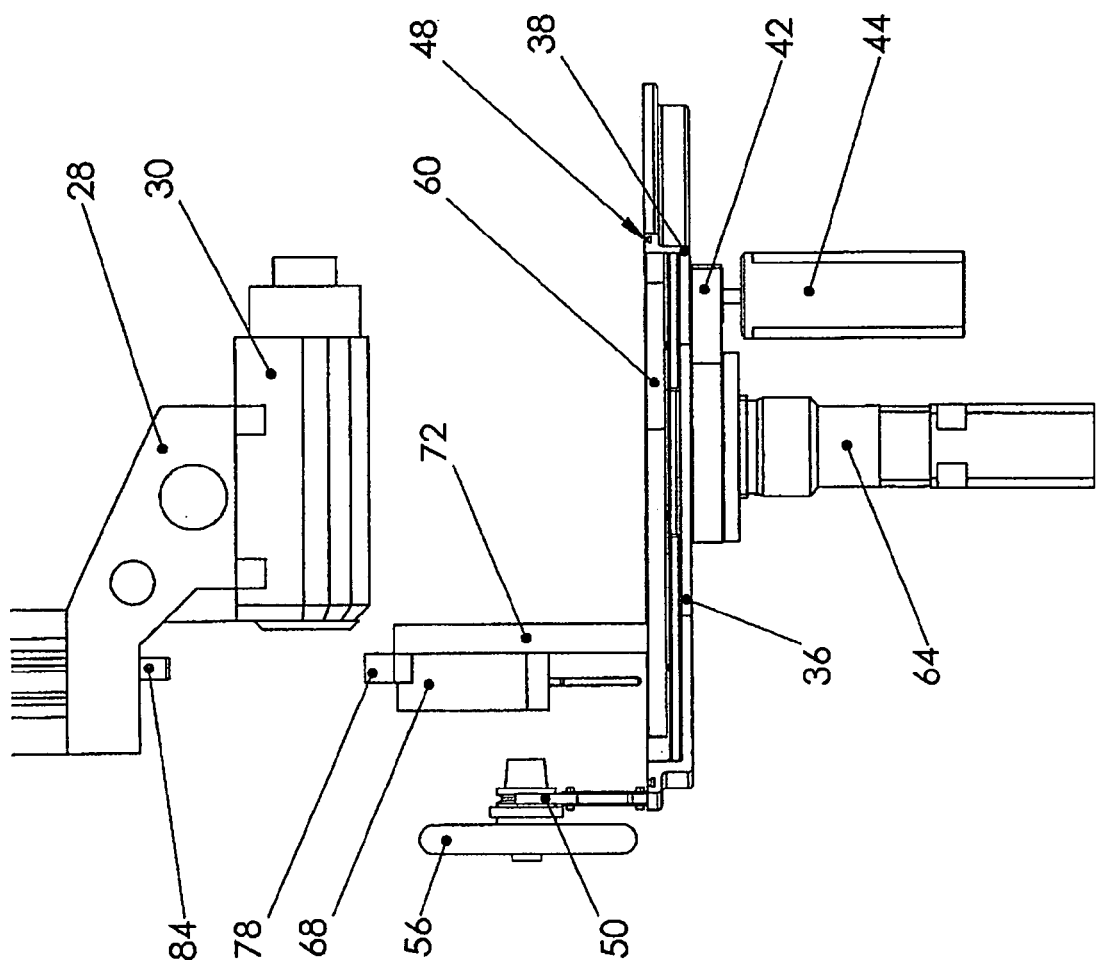
Figure 22:
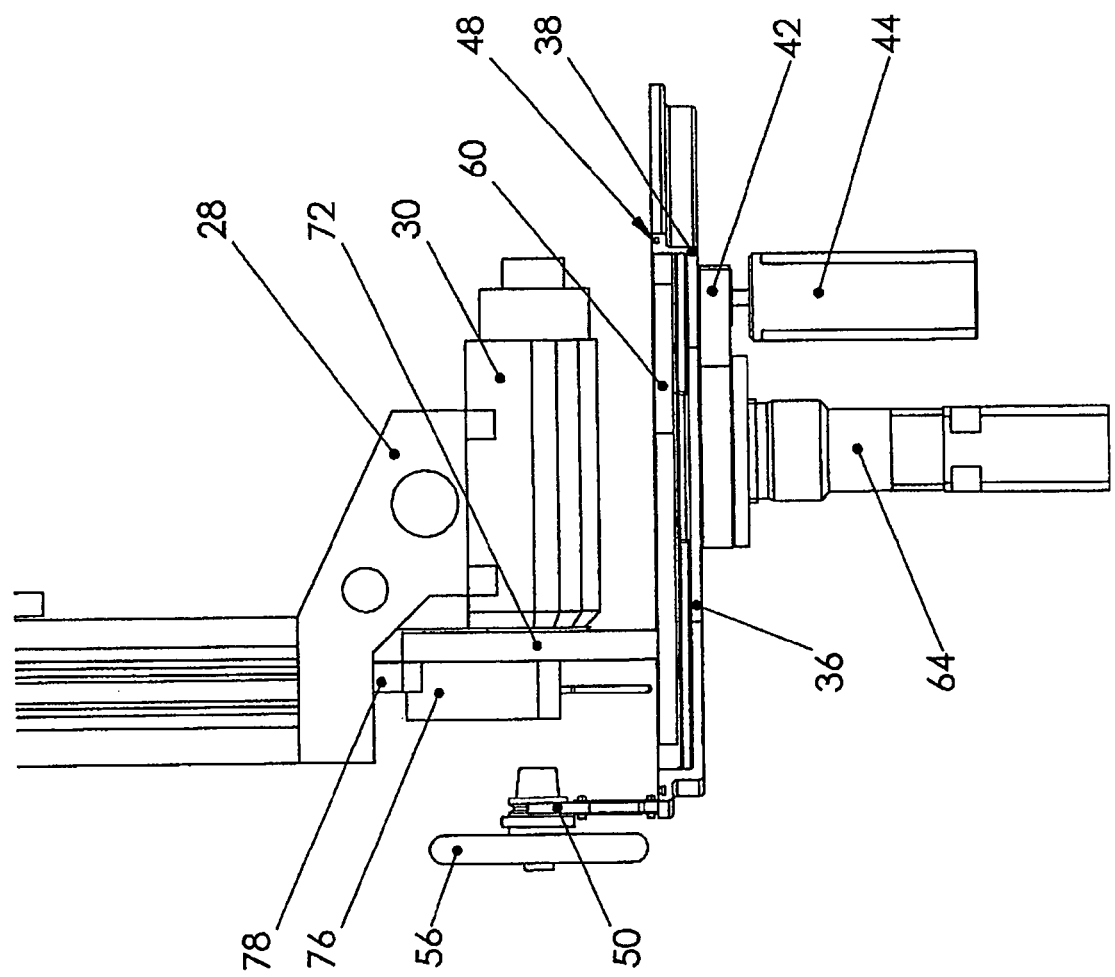
Figure 23:
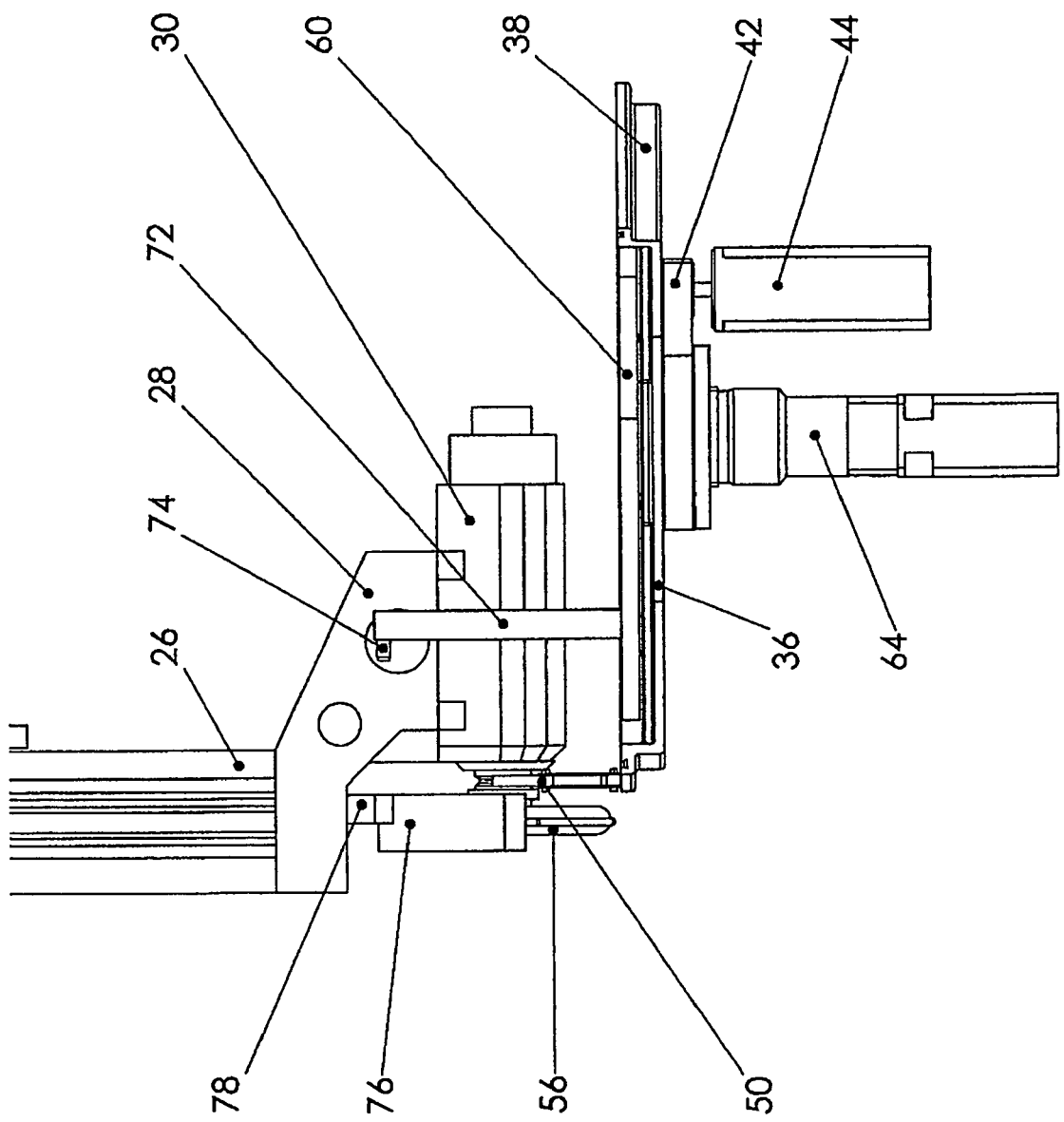
Figure 24:
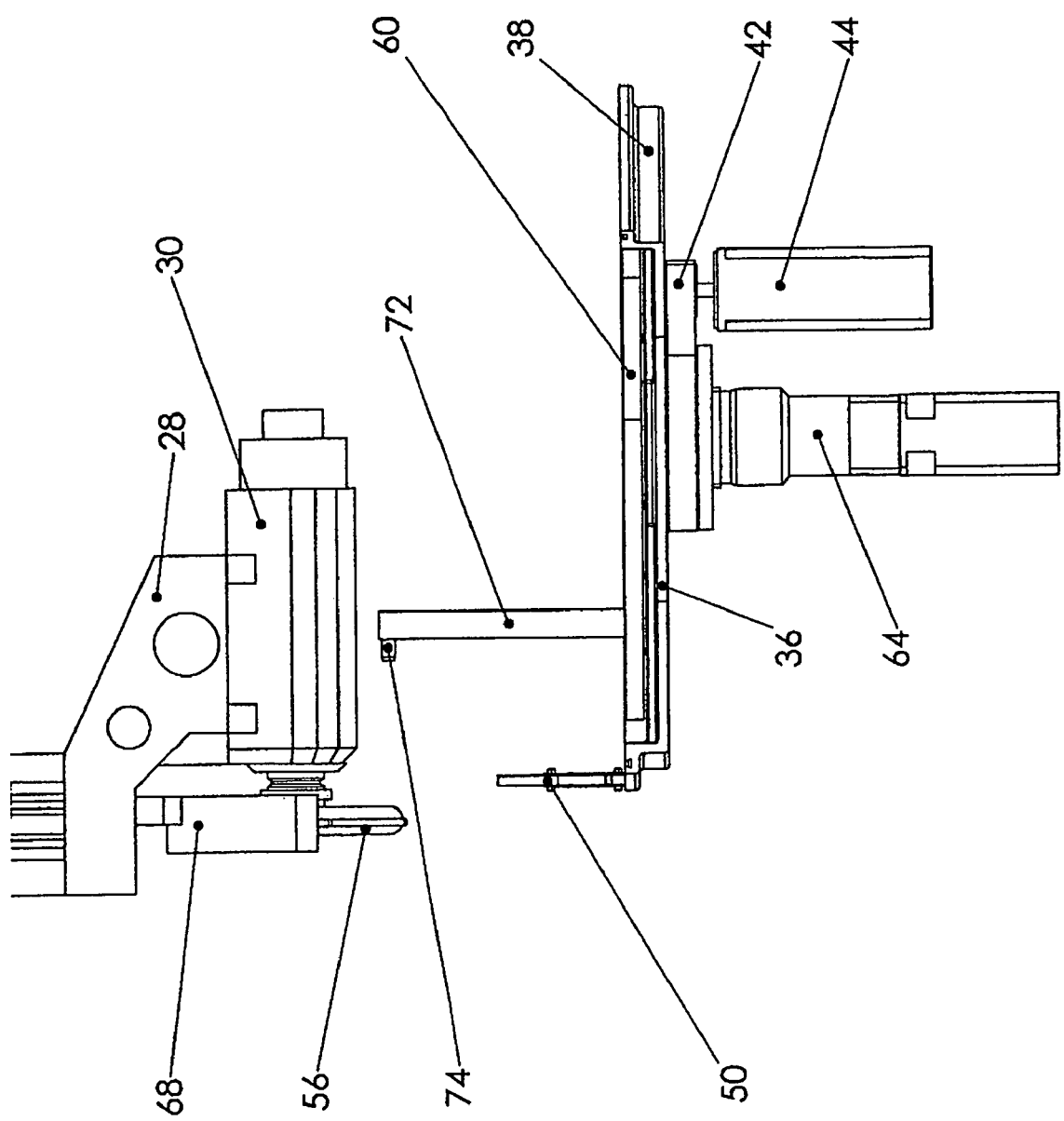

Thereafter, the Z-slide 26 along with the support 28 and the tool spindle 30 are moved above the grinding wheel protector 68 above the tool magazine, as shown in FIG. 21. The Z-slide 26 is then lowered vertically, whereby the coupling stud 84 of the support 28 engages into the coupling hole 82 and the grinding wheel protector 68 is coupled with the support 28. FIG. 22 shows this. Subsequently, the Z-slide 26 is moved along the Y-axis, as shown in FIG. 23. The grinding wheel protector 68 coupled via the coupling stud 84 with the support 28 is pulled off the mounting mandrels 74 of its protector mounting 70 in the radial direction, and the tool spindle 30 is pushed with its tool mounting onto the tool shaft of the tool 56, so that the tool can be clamped 56 by the tool spindle 30 as shown in FIG. 23. Thereafter, the Z-slide 26 is moved up vertically, so that the tool 56 is lifted out of its tool holder 50 as shown in FIG. 24. The tool spindle 30 with the clamped tool 56 and the grinding wheel protector 68 coupled to the support 28 can now be moved into the work space for processing the work piece.

The delivery of a tool 56 and an associated grinding wheel protector 68 into the tool magazine takes place in the reverse order of these steps.

REFERENCE SYMBOL LIST

10 Machine bed
12 Work piece spindle
14 Work piece spindle drive unit
16 Work piece
18 Tailstock
20 Side walls
22 Y-guides
24 Bridge
26 Z-slide
28 Support
30 Tool spindle
32 Partitions
34 Outer magazine wheel
36 Magazine disk
38 Magazine ring
40 Drive shaft
42 Toothed belt
44 Motor
46 Cutout
48 T-groove
50 Tool holder
50' Open tool holder
52 Foot
54 Mounting
56 Tools
58 Inner magazine wheel
60 Magazine disk
62 Drive shaft
64 Motor
68 Grinding wheel protector
70 Protector mountings
70' Open protector mounting
72 Support arms
74 Mounting mandrel
76 Protective cover
78 Mounting bracket
80 Coolant nozzles
82 Coupling hole
84 Coupling stud

The invention claimed is:

1. Machine tool with at least one tool spindle and with a tool storage device which holds multiple tools in tool holders and is movable in a controlled manner in order to bring a respectively selectable tool holder into an exchange position, with the tools each being arranged in the tool holders so that their central longitudinal axis lies in the plane of motion of the tool storage device and with the tool spindle able to take the tools in the exchange position out of the tool holder and deliver them into the tool holder as the tool spindle is moved into axial alignment with the respective tool, characterized in that the tool storage device has two tool magazines (34, 58), that tools are held in tool holders in each of the two tool magazines (34, 58), with the tools being arranged in the two tool magazines (34, 58) with their central longitudinal axes extending radially relative a rotation axis of the tool storage device and with the tools of one of the two magazines each being spaced in their axial direction with respect to the tools of the respective other tool magazine, and that the two tool magazines (34, 58) are independently movable in parallel planes of motion in a controlled manner in order to bring their respectively selected tool holders into the exchange position.

2. Machine tool according to claim 1, characterized in that the two tool magazines (34, 58) are configured to rotate in their plane of motion and that the tools are arranged in the tool holders with their axis pointing radially to the rotational path of their respective tool magazine.

3. Machine tool according to claim 2, characterized in that the tools are each mounted in the tool holders with their axis directed radially toward the inside of the rotational path and that the tool spindle (28) is movable radially relative to the tools from the inside of the rotational path.

4. Machine tool according to claim 2, characterized in that the two tool magazines are designed as concentrically rotatable magazine wheels (34, 58), with the tool holders (50) on the outer magazine wheel (34) being arranged on a larger radius than the tool holders (70) on the inner magazine wheel (58).

5. Machine tool according to claim 4, characterized in that the magazine wheels (34, 58) each have a segment-shaped cutout (46), into which a work space of the machine tool fits, if the magazine wheels (34, 58) are in their rest position.

6. Machine tool according to claim 4, characterized in that tools (56) are held in the outer magazine wheel (34) and additional devices (68) in the inner magazine wheel (58).

7. Machine tool according to claim 6, characterized in that the outer magazine wheel (34) and the inner magazine wheel (58) can be brought into the exchange position with tools (56) and additional devices (68) that are associated with each other, with the respective tool (56) and the respective additional device (68) being substantially simultaneously receivable or deliverable so that, through a radial displacement of the tool spindle (30), one immediately follows the other.

8. Machine tool according to claim 1, characterized in that the two tool magazines each have an open space, which can be carried into the exchange position, so that, by means of this open space, the tool spindle (30) can be moved to a position with respect to the two tool magazines (34, 58) so as to be able to access the tools held thereby in an unhindered manner.

9. Machine tool according to claim 1, characterized in that the two tool magazines (34, 58) are of modular construction so that the tool storage device can be optionally used with one or two tool magazines.

10. Machine tool according to claim 1, which is designed as a grinding machine, characterized in that tools (56) and additional devices are held in the tool storage device.

11. Machine tool according to claim 10, wherein the tools are grinding tools and the additional devices are grinding wheel protectors.

* * * * *